US009724992B2

(12) United States Patent
Niimi

(10) Patent No.: US 9,724,992 B2
(45) Date of Patent: Aug. 8, 2017

(54) HYBRID VEHICLE

(71) Applicant: TOYOTA JIDOSHA KABUSHIKI KAISHA, Toyota-shi, Aichi-ken (JP)

(72) Inventor: Kuniaki Niimi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/125,006

(22) PCT Filed: Mar. 20, 2015

(86) PCT No.: PCT/IB2015/000377
§ 371 (c)(1),
(2) Date: Sep. 9, 2016

(87) PCT Pub. No.: WO2015/145237
PCT Pub. Date: Oct. 1, 2015

(65) Prior Publication Data
US 2017/0021714 A1    Jan. 26, 2017

(30) Foreign Application Priority Data

Mar. 24, 2014    (JP) .................................. 2014-059952

(51) Int. Cl.
*B60K 6/442*    (2007.10)
*B60W 10/02*    (2006.01)
(Continued)

(52) U.S. Cl.
CPC .............. *B60K 6/442* (2013.01); *B60K 6/387* (2013.01); *B60L 11/123* (2013.01);
(Continued)

(58) Field of Classification Search
CPC .......... B60K 6/44; B60K 6/442; B60K 6/387; B60L 11/123; B60L 11/126; B60L 11/14; B60W 20/13
See application file for complete search history.

(56) References Cited

U.S. PATENT DOCUMENTS 4,335,429 A * 6/1982 Kawakatsu ............ B60K 6/387
180/65.23
5,343,970 A * 9/1994 Severinsky ............ B60K 6/387
180/165

(Continued)

FOREIGN PATENT DOCUMENTS

CN    101612883 A    12/2009
EP    2557007 A1    2/2013
(Continued)

*Primary Examiner* — Frank Vanaman
(74) *Attorney, Agent, or Firm* — Oliff PLC

(57) ABSTRACT

A hybrid vehicle includes an internal combustion engine, a first rotating electrical machine, a second rotating electrical machine, a clutch, an electrical storage device, and an electronic control unit. The electronic control unit is configured to control the first rotating electrical machine, the second rotating electrical machine, the clutch, and the internal combustion engine, such that the hybrid vehicle runs while making a changeover among a plurality of running modes. The plurality of the running modes includes series hybrid running and parallel hybrid running. The electronic control unit is configured to set a range of state of charge of the electrical storage device such that the range of state of charge that is set during the parallel hybrid running includes a region of state of charge that is higher than the range of state of charge that is set during the series hybrid running.

3 Claims, 13 Drawing Sheets

(51) Int. Cl.

| | |
|---|---|
| *B60W 10/06* | (2006.01) |
| *B60W 10/08* | (2006.01) |
| *B60W 10/26* | (2006.01) |
| *B60W 20/20* | (2016.01) |
| *B60W 20/13* | (2016.01) |
| *B60K 6/387* | (2007.10) |
| *B60L 11/18* | (2006.01) |
| *B60L 11/12* | (2006.01) |
| *B60L 11/14* | (2006.01) |
| *B60W 30/188* | (2012.01) |

(52) U.S. Cl.
CPC ............ *B60L 11/126* (2013.01); *B60L 11/14* (2013.01); *B60L 11/1862* (2013.01); *B60W 10/02* (2013.01); *B60W 10/06* (2013.01); *B60W 10/08* (2013.01); *B60W 10/26* (2013.01); *B60W 20/13* (2016.01); *B60W 20/20* (2013.01); *B60L 2260/26* (2013.01); *B60W 30/1882* (2013.01); *B60W 2710/0677* (2013.01); *B60W 2710/244* (2013.01); *B60W 2710/248* (2013.01); *Y02T 10/6217* (2013.01); *Y02T 10/6234* (2013.01); *Y02T 10/6286* (2013.01); *Y02T 10/7005* (2013.01); *Y02T 10/705* (2013.01); *Y02T 10/7044* (2013.01); *Y02T 10/7077* (2013.01); *Y02T 90/34* (2013.01)

(56) References Cited

U.S. PATENT DOCUMENTS

| | | | |
|---|---|---|---|
| 5,842,534 A * | 12/1998 | Frank .................... | B60K 6/48 180/65.25 |
| 6,359,419 B1 * | 3/2002 | Verbrugge ............ | B60K 6/44 320/132 |
| 2010/0100265 A1 * | 4/2010 | Kato ..................... | B60K 6/445 701/22 |
| 2011/0017534 A1 | 1/2011 | Kaltenbach et al. | |
| 2011/0172867 A1 * | 7/2011 | Yu ......................... | B60K 6/445 701/22 |
| 2011/0257823 A1 * | 10/2011 | Watanabe .............. | B60K 6/445 701/22 |
| 2013/0030638 A1 | 1/2013 | Nissato | |
| 2013/0166125 A1 * | 6/2013 | Yamamoto ............. | B60L 7/14 701/22 |
| 2016/0200314 A1 * | 7/2016 | Tagami .................. | B60K 6/46 701/22 |

FOREIGN PATENT DOCUMENTS

| | | |
|---|---|---|
| JP | 2011-156985 A | 8/2011 |
| JP | 2011-230642 A | 11/2011 |
| JP | 2012-006525 A | 1/2012 |
| WO | 2009/021913 A2 | 2/2009 |
| WO | 2011/129196 A1 | 10/2011 |
| WO | 2012/085614 A1 | 6/2012 |

* cited by examiner

HYBRID VEHICLE

BACKGROUND OF THE INVENTION

1. Field of the Invention

This invention relates to a hybrid vehicle, and more particularly, to a hybrid vehicle that has the function of running while making a changeover between so-called series hybrid running and so-called parallel hybrid running.

2. Description of Related Art

A hybrid vehicle that runs while making a changeover between series hybrid running (hereinafter referred to also as "series HV running") in which a rotating electrical machine generates a running driving force through the use of an electric power that is generated by a motive power of an internal combustion engine and parallel hybrid running (hereinafter referred to also as "parallel HV running") in which the internal combustion engine generates a running driving force and the rotating electrical machine assists the running driving force according to need is disclosed in, for example, WO 2011/129196.

In the hybrid vehicle described in WO 2011/129196, the changeover condition is changed based on the state of charge (the SOC) of a battery in the control for making a changeover between series HV running and parallel HV running in accordance with the vehicle speed. Thus, running control can be stabilized and facilitated.

In the hybrid vehicle as described above, during series HV running, the internal combustion engine is mechanically decoupled from driving wheels, so the rotational speed of the internal combustion engine can be set independently of the current vehicle speed (the rotational speed of the driving wheels). Thus, the degree of freedom in setting an operating point that is defined as a combination of a rotational speed and a torque of the internal combustion engine is enhanced, so the internal combustion engine can be operated with the operating point corresponding to high efficiency selected.

On the other hand, during parallel HV running, the internal combustion engine is mechanically coupled to the driving wheels, so the rotational speed of the internal combustion engine is restricted according to the vehicle speed. Therefore, in order for the internal combustion engine to operate at an operating point with high thermal efficiency, the output torque of the internal combustion engine needs to be increased and reduced with respect to the torque needed for running. For example, in the case where the operating point of the internal combustion engine is set in a high-efficiency region by increasing the torque of the internal combustion engine, a surplus output of the internal combustion engine is used to generate an electric power by the rotating electrical machine, and is thereby absorbed as a charging electric power of an electrical storage device.

SUMMARY OF THE INVENTION

However, in the hybrid as described above, the internal combustion engine has difficulty operating at a high-efficiency operating point in the case where the electrical storage device cannot afford to accept a charging electric power. Thus, there is an apprehension that the fuel economy during running may deteriorate.

The invention provides a hybrid vehicle that has the function of running while making a changeover between series hybrid running and parallel hybrid running and that runs with improved fuel economy.

A hybrid vehicle according to one aspect of the invention includes an internal combustion engine, a first rotating electrical machine, a second rotating electrical machine, a clutch, an electrical storage device, and an electronic control unit. The first rotating electrical machine is mechanically coupled to the internal combustion engine. The second rotating electrical machine is mechanically coupled to a driving wheel. The clutch is configured to make a changeover between a coupling state for forming a mechanical motive power transmission path between the internal combustion engine and the driving wheel and a decoupling state for decoupling the motive power transmission path. The electrical storage device gives an electric power to the first rotating electrical machine and the second rotating electrical machine and receives the electric power from the first rotating electrical machine and the second rotating electrical machine. The electronic control unit is configured to control the first rotating electrical machine, the second rotating electrical machine, the clutch, and the internal combustion engine, such that the hybrid vehicle runs while making a changeover among a plurality of running modes. The plurality of the running modes includes series hybrid running and parallel hybrid running. The series hybrid running is designed to control the clutch to the decoupling state and operate the internal combustion engine such that the hybrid vehicle runs by an output of the second rotating electrical machine while the first rotating electrical machine generates the electric power. The parallel hybrid running is designed to control the clutch to the coupling state and operate the internal combustion engine such that the hybrid vehicle runs using at least part of an output of the internal combustion engine. The electronic control unit is configured to set a range of state of charge of the electrical storage device such that the range of state of charge that is set during the parallel hybrid running includes a region of state of charge that is higher than the range of state of charge that is set during the series hybrid running.

According to the aforementioned aspect of the invention, the degree of freedom in charging the electrical storage device in the parallel hybrid running in which the output of the internal combustion engine is utilized with high efficiency can be enhanced by suppressing the state of charge in the series hybrid running. Thus, in the parallel hybrid running, it is easy to set the operating point of the internal combustion engine in such a manner as to enhance the efficiency of the internal combustion engine, by outputting the charging power of the electrical storage device in addition to the running power. Therefore, the fuel economy of the hybrid vehicle can be improved.

In the aforementioned aspect of the invention, the electronic control unit may be configured to control the output of the internal combustion engine such that the state of charge of the electrical storage device approaches a state-of-charge control target. The electronic control unit may be configured to set the state-of-charge control target such that the state-of-charge control target that is set during the parallel hybrid running becomes higher than the state-of-charge control target that is set during the series hybrid running. Alternatively, in the aforementioned aspect of the invention, the electronic control unit may be configured to control the output of the internal combustion engine such that the state of charge of the electrical storage device approaches the state-of-charge control target in each of the series hybrid running and the parallel hybrid running. The electronic control unit may be configured to control the output of the internal combustion engine such that a charging and discharging power of the electrical storage device in the parallel hybrid running has a region that is larger on a charging side than the charging and discharging power in the series hybrid running for a same state of charge.

According to this aspect of the invention, the state of charge in the series hybrid running can be suppressed, and the degree of freedom in charging the electrical storage device in the parallel hybrid running can be enhanced, by creating a difference between the state-of-charge control target and the charging and discharging power for the same state of charge in the series hybrid running and the state-of-charge control target and the charging and discharging power for the same state of charge in the parallel hybrid running.

In the aforementioned aspect of the invention, the electronic control unit may be configured to prohibit the electrical storage device from being charged such that the state of charge of the electrical storage device does not exceed a state-of-charge control upper limit in each of the series hybrid running and the parallel hybrid running. The electronic control unit may be configured to set the state-of-charge control upper limit such that the state-of-charge control upper limit that is set for the parallel hybrid running becomes higher than the state-of-charge control upper limit that is set for the series hybrid running.

According to this aspect of the invention, the state of charge in the series hybrid running can be suppressed, and the degree of freedom in charging the electrical storage device during the parallel hybrid running can be enhanced, by creating a difference between the state-of-charge control upper limit (the state-of-charge upper limit at which charging is prohibited in terms of control) in the series hybrid running and the state-of-charge control upper limit in the parallel hybrid running.

In the aforementioned aspect of the invention, the electronic control unit may be configured to control the output of the internal combustion engine based on a sum of a running power that is required for running of the hybrid vehicle and a charging and discharging power of the electrical storage device for controlling the state of charge of the electrical storage device. The electronic control unit may be configured to limit the output of the internal combustion engine in the parallel hybrid running such that the charging and discharging power of the electrical storage device does not exceed a difference between an engine output power and the running power at an operating point corresponding to a current rotational speed of the internal combustion engine on an optimal operating line that is set in advance in accordance with an efficiency of the internal combustion engine.

According to this aspect of the invention, when the state-of-charge control is executed by adjusting the output of the internal combustion engine in such a manner as to enhance the degree of freedom in charging the electrical storage device in the parallel hybrid running, the operating point of the internal combustion engine can be set in such a manner as to become as close as possible to the optimal operating line within the range of the state-of-charge control. Thus, the fuel economy of the hybrid vehicle in the parallel hybrid running can be further improved.

In the aforementioned aspect of the invention, the plurality of the running modes may include EV running. The EV running is designed to control the clutch to the decoupling state, stop the internal combustion engine, and cause the hybrid vehicle to run by an output of the second rotating electrical machine. The electronic control unit may include a charge depleting mode and a charge sustaining mode as control modes. The electronic control unit may be configured to select one of the series hybrid running, the parallel hybrid running, and the EV running in accordance with a running situation of the hybrid vehicle in each of the charge depleting mode and the charge sustaining mode. The electronic control unit may be configured to set the range of state of charge during control in the charge sustaining mode such that the range of state of charge that is set during the parallel hybrid running includes a region on the state-of-charge that is higher than the range of state of charge that is set during the series hybrid running.

According to this aspect of the invention, when the hybrid vehicle that is designed to select the charge depleting mode and the charge sustaining mode is in the charge sustaining mode, it is easy to set the operating point of the internal combustion engine in such a manner as to enhance the efficiency of the internal combustion engine, by enhancing the degree of freedom in charging the electrical storage device in the parallel hybrid running in which the output of the internal combustion engine is utilized with high efficiency. Thus, the fuel economy of the hybrid vehicle in the charge sustaining mode can be improved.

In the aforementioned aspect of the invention, the electronic control unit may be configured to operate the internal combustion engine and select the series hybrid running or the parallel hybrid running when a sum of a running power required for running of the vehicle and a charging and discharging power of the electrical storage device exceeds a threshold in each of the charge depleting mode and the charge sustaining mode. The electronic control unit may be configured to control the output of the internal combustion engine in each of the series hybrid running and the parallel hybrid running to the running power during control in the charge depleting mode.

According to this aspect of the invention, in the charge depleting mode, even in the case where the series hybrid running or the parallel hybrid running is selected, the output of the internal combustion engine is controlled in accordance with the running power, without including the charging and discharging electric power of the electrical storage device. Thus, the fuel economy in the charge sustaining mode is improved. In addition, the state-of-charge control is not executed in the charge depleting mode, so the frequency with which the internal combustion engine is operated is reduced, and the range of application of EV running can be enlarged.

In the aforementioned aspect of the invention, a speed ratio between an output shaft of the internal combustion engine and an axle of the driving wheel may be fixed when the clutch is in the coupling state.

According to this aspect of the invention, in the configuration in which the rotational speed of the internal combustion engine in the parallel hybrid running is restricted through fixation of the speed ratio, the degree of freedom in setting the operating point of the internal combustion engine can be enhanced. Thus, in the parallel hybrid running, it is easy to set the operating point of the internal combustion engine in such a manner as to enhance the efficiency of the internal combustion engine as the electrical storage device is charged. Therefore, the fuel economy of the hybrid vehicle can be improved.

The invention provides a hybrid vehicle that has the function of running while making a changeover between series hybrid running and parallel hybrid running and that runs with improved fuel economy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
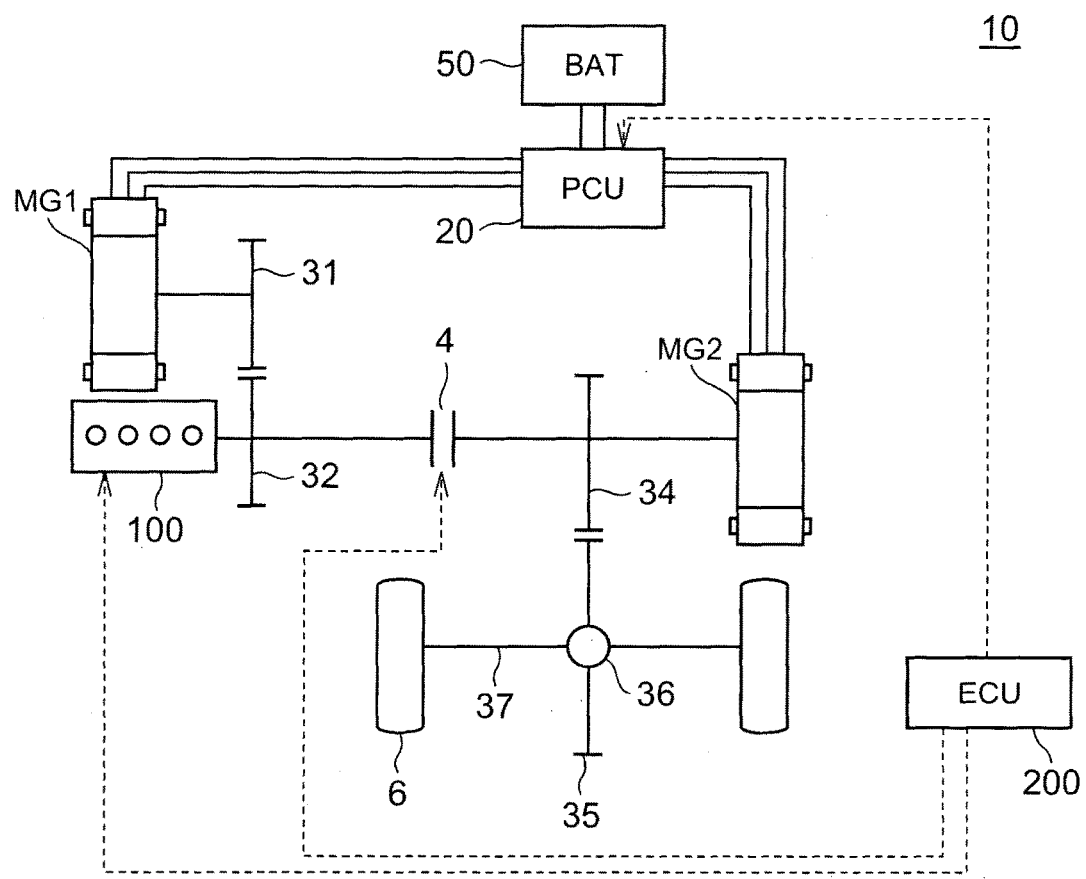
FIG. 1 is a block diagram showing the overall configuration of a hybrid vehicle according to the first embodiment of this invention.

The embodiments of the invention will be described hereinafter in detail with reference to the drawings. Although the plurality of the embodiments of the invention will be described hereinafter, a suitable combination of configurations described in the respective embodiments of the invention has been taken into account since the filing of the application. Incidentally, like or equivalent components are denoted by like reference symbols in the drawings, and the description thereof will not be repeated.

FIG. 1 is a block diagram showing the overall configuration of a hybrid vehicle according to the first embodiment of this invention.

Referring to FIG. 1, a hybrid vehicle 10 includes an engine 100, motor-generators MG1 and MG2, a clutch 4, driving wheels 6, gears 31 and 32, an output gear 34, a differential gear device 36, and axles 37. Besides, the hybrid vehicle 10 further includes an electric power control unit (a PCU) 20, an electrical storage device 50, and a control device 200.

The engine 100 is constituted by "an internal combustion engine" that generates a motive power by burning a hydrocarbon-based fuel such as gasoline, light oil or the like. The motor-generators MG1 and MG2 are AC rotating electrical machines, and are configured as, for example, three-phase AC synchronous motor-generators.

An output shaft (a crankshaft) of the engine 100 and an output shaft of the motor-generator MG1 are coupled to each other via the gears 31 and 32. An output shaft of the motor-generator MG2 is coupled to the output gear 34. The output gear 34 is coupled to a gear 35 that is provided in the differential gear device 36. The driving wheels 6 are coupled to the differential gear device 36 via the right and left axles 37. In this manner, the motor-generator MG1 is mechanically coupled to the engine 100, and the motor-generator MG2 is mechanically coupled to the driving wheels 6.

The clutch 4 is provided between the output shaft (the crankshaft) of the engine 100 and the output gear 34. The clutch 4 is configured as, for example, a hydraulic friction engagement device. The clutch 4 is controlled to either "a coupling state" for mechanically coupling the engine 100 and the output gear 34 to each other or "a decoupling state" for decoupling the engine 100 and the output gear 34 from each other, in response to a control signal from the control device 200. That is, when the clutch 4 is controlled to the coupling state, a mechanical motive power transmission path is formed between the engine 100 and the driving wheels 6. On the other hand, when the clutch 4 is controlled to the decoupling state, the mechanical motive power transmission path between the engine 100 and the driving wheels 6 is decoupled. As will be described later in detail, a changeover in the running mode of the hybrid vehicle 10 is made by controlling the clutch 4.

In a configurational example of FIG. 1, an output of the engine 1 is transmitted to the driving wheels 6 via the output gear 34, without the intermediary of a transmission. Therefore, the speed ratio between the output shaft of the engine 100 and the axles 37 of the driving wheels 6 is fixed. The configuration is simplified by refraining from arranging the transmission.

Incidentally, a gear constituting a reduction gear can also be arranged between the output shaft of the motor-generator MG2 and the output gear 34. Alternatively, the output shaft of the engine 100 and the motor-generator MG1 may be coupled to each other without the intermediary of a gear.

The motor-generator MG1 corresponds to an embodiment of "the first rotating electrical machine", and the motor-generator MG2 corresponds to an embodiment of "the second rotating electrical machine". Besides, the clutch 4 corresponds to an embodiment of "the changeover device".

The electrical storage device 50 is an electric power storage element that is configured in a re-dischargeable manner. The electrical storage device 50 is configured to include, for example, a secondary battery such as a lithium-ion battery, a nickel hydride battery, a lead storage battery or the like, or a cell of an electrical storage element such as an electric double layer capacitor or the like. Although not shown in the drawing, the electrical storage device 50 is provided with sensors for detecting a temperature, a current, and a voltage.

The control device 200 calculates a state of charge (an SOC) indicating a remaining capacity of the electrical storage device 50, based on detected values obtained by these sensors (not shown). The SOC is usually indicated as the percentage of the current remaining capacity to a fully charged state of the electrical storage device 50. The SOC can be calculated according to any known method.

The electrical storage device 50 is electrically connected to a PCU 20 for driving the motor-generators MG1 and MG2. The PCU 20 converts a DC electric power supplied from the electrical storage device 50, into an AC electric power, and drives the motor-generators MG1 and MG2. Alternatively, the PCU 20 converts AC electric powers generated by the motor-generators MG1 and MG2, into DC electric powers, and charges the electrical storage device 50 therewith. The PCU 20 controls AC voltages applied to the motor-generators MG1 and MG2, in accordance with command values (e.g., torque command values) of the motor-generators MG1 and MG2 generated by the control device 200.

The motor-generator MG2 operates as an electric motor through the outputting of a positive torque, and can thereby generate a running driving force (a torque) of the hybrid vehicle 10. On the other hand, when the hybrid vehicle 10 is braked, the motor-generator MG2 can operate as a generator that converts a turning force of the driving wheels 6 into a charging electric power of the electrical storage device 50, through the outputting of a negative torque. That is, the motor-generator MG2 can operate as a regenerative brake.

The motor-generator MG1 operates as an electric motor through the outputting of a positive torque, and can thereby start the engine 100. Furthermore, when the engine 100 is in operation, the motor-generator MG1 can operate as a generator that converts an output of the engine 100 into a charging electric power of the electrical storage device 50, through the outputting of a negative torque.

In this manner, the electrical storage device 50 can give an electric power to the motor-generators MG1 and MG2 via the PCU 20 and receive the electric power from the motor-generators MG1 and MG2 via the PCU 20.

The control device 200 is configured as, representatively, an electronic control unit (an ECU) that includes a central processing unit (a CPU) (not shown), a storage unit (not shown), an input/output buffer (not shown) and the like. The control device 200 outputs signals for controlling respective components of the hybrid vehicle 10, based on signals input from the various sensors and an operation input from a driver. For instance, the control device 200 generates control signals for the clutch 4, the PCU 20, and the engine 100 for running control of the hybrid vehicle 10 and charging and discharging control of the electrical storage device 50.

The hybrid vehicle 10 according to the embodiment of the invention runs while the control device 200 makes a changeover among a plurality of running modes. More specifically, the running modes include "EV running" in which the hybrid vehicle runs with the engine 100 stopped, and "HV running" in which the hybrid vehicle runs with the engine 100 in operation. Furthermore, HV running is classified into "series HV running" in which the output of the engine 100 is used only to generate an electric power, and "parallel HV running" in which at least part of the output of the engine 100 is directly used to cause the vehicle to run. That is, the hybrid vehicle 10 runs while making a changeover among EV running, series HV running, and parallel HV running in accordance with the running circumstances.

Figure 2:
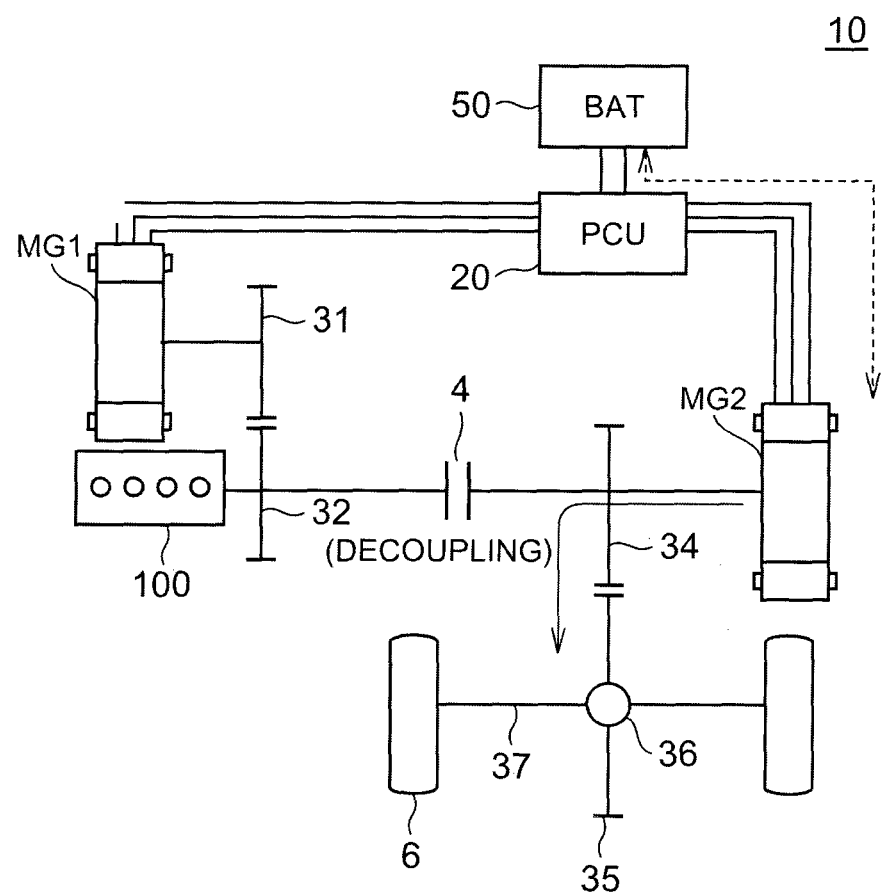
FIG. 2 is a block diagram for illustrating a motive power transmission path in EV running.

Next, the motive power transmission path in each of the running modes will be described using FIGS. 2 to 4. FIG. 2 is a block diagram for illustrating the motive power transmission path during EV running.

Referring to FIG. 2, the clutch 4 is controlled to the decoupling state in EV running. In EV running, the engine 100 is stopped, and the hybrid vehicle 10 runs by an output of the motor-generator MG2 that uses the electric power stored in the electrical storage device 50. Even during EV running, the electric power generated by the motor-generator MG2 through the regenerative brake can be recovered by the electrical storage device 50.

Figure 3:
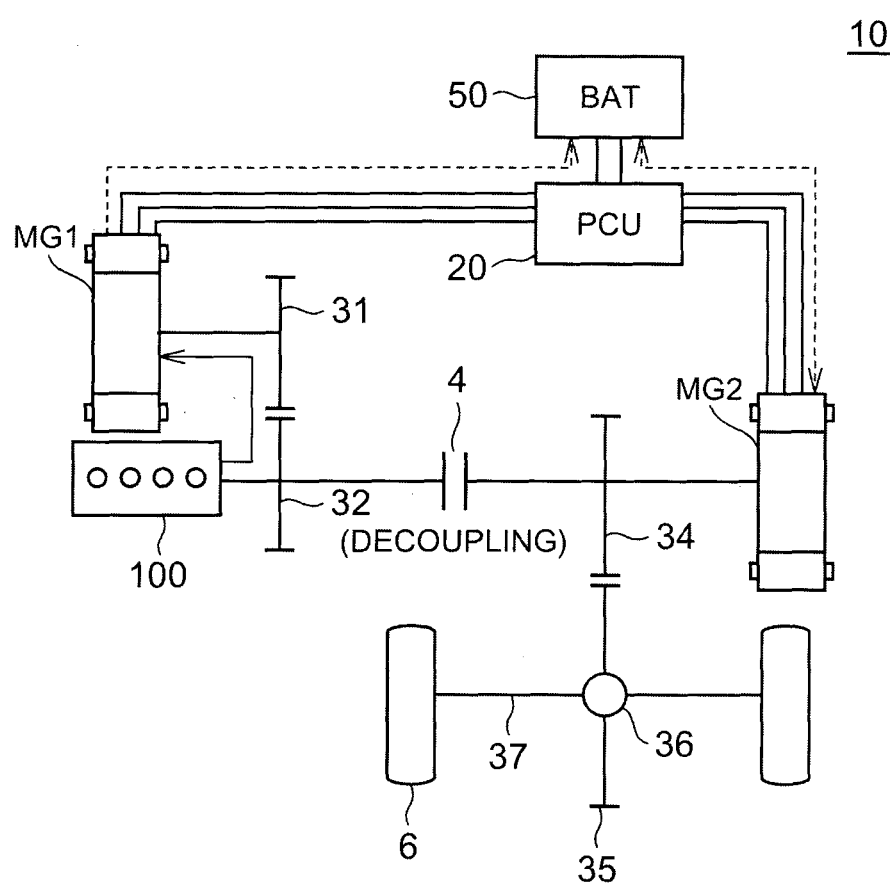
FIG. 3 is a block diagram for illustrating a motive power transmission path in series HV running.

FIG. 3 is a block diagram for illustrating the motive power transmission path in series HV running. Referring to FIG. 3, in series HV running, the engine 100 is operated, and the clutch 4 is controlled to the decoupling state. Accordingly, the output of the engine 100 is transmitted to the motor-generator MG1 instead of being transmitted to the driving wheels 6. The motor-generator MG1 generates an electric power by an output of the engine 100. The hybrid vehicle 10 runs by an output of the motor-generator MG2, using the generated electric power according to the motor-generator MG1 and/or the electric power stored in the electrical storage device 50.

That is, in series HV running, when the electric power generated by the motor-generator MG1 is surplus with respect to a power needed for the vehicle to run (hereinafter referred to also as "a running power"), this surplus electric power is stored in the electrical storage device 50. On the other hand, when the electric power generated by the motor-generator MG1 is insufficient with respect to the running power, the electric power discharged from the electrical storage device 50 is added to the electric power generated by the motor-generator MG1, and the motor-generator MG2 operates. Accordingly, the electrical storage device 50 is charged/discharged in accordance with a deviation of an engine output power from the running power of the hybrid vehicle 10. Incidentally, during series HV running as well, the electric power generated by the motor-generator MG2 through the regenerative brake can be recovered by the electrical storage device 50.

Figure 4:
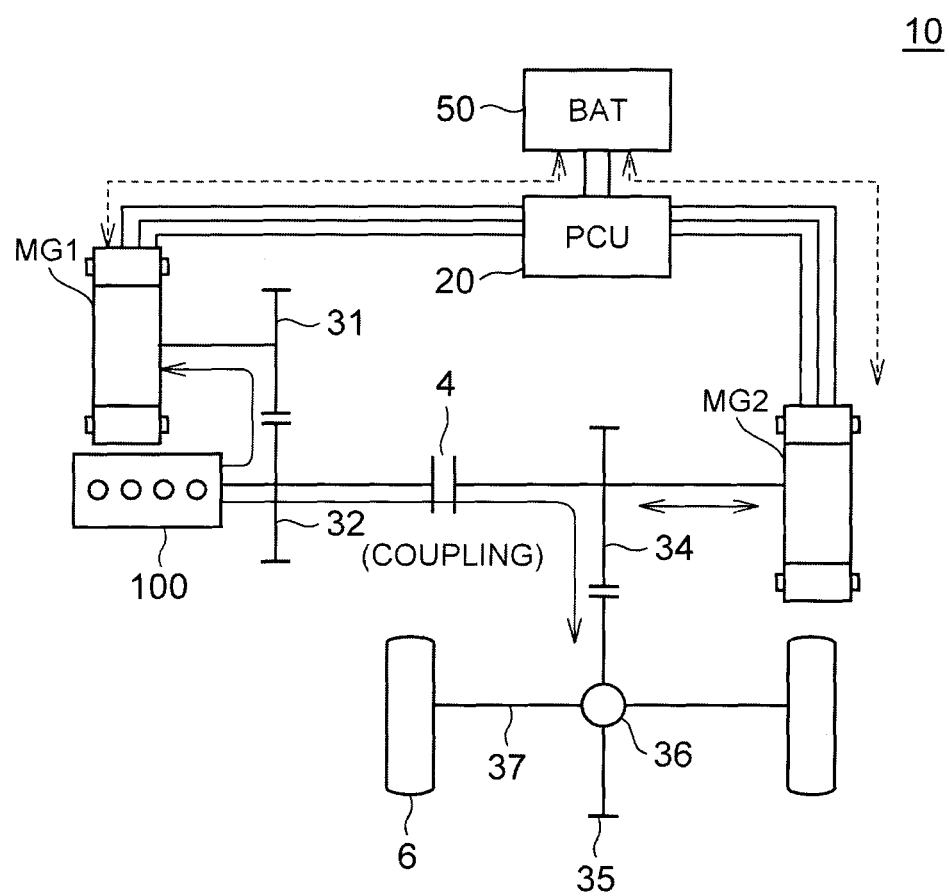
FIG. 4 is a block diagram for illustrating a motive power transmission path in parallel HV running.

FIG. 4 is a block diagram for illustrating the motive power transmission path in parallel HV running. Referring to FIG. 4, in parallel HV running, the engine 100 is operated, and the clutch 4 is controlled to the coupling state. Accordingly, the output of the engine 100 is transmitted to the driving wheels 6. Furthermore, the output of the motor-generator MG2 is also transmitted to the driving wheels 6. Accordingly, in parallel HV running, the hybrid vehicle 10 runs by the output of the engine 100 or the outputs of the engine 100 and the motor-generator MG2.

Incidentally, in parallel HV running, when the engine output power is surplus with respect to the running power, this surplus power is used to cause the motor-generator MG1 and/or the motor-generator MG2 to generate an electric power, so the charging electric power of the electrical storage device 50 is generated. On the other hand, when the engine output power is insufficient with respect to the running power, the motor-generator MG2 assists a vehicle driving force by the discharging electric power of the electrical storage device 50. That is, in parallel HV running as well, the electrical storage device 50 is charged/discharged in accordance with the deviation of the engine output power from the running power of the hybrid vehicle 10. Incidentally, during parallel HV running as well, the electric power generated by the motor-generator MG2 through the regenerative brake can be recovered by the electrical storage device 50.

In parallel HV running shown in FIG. 4, the speed ratio between the engine 100 and the driving wheels 6 is fixed, so the engine rotational speed is uniquely determined with respect to the vehicle speed. Therefore, the degree of freedom in setting the operating point of the engine 100 becomes low. By contrast, in series HV running shown in FIG. 3, no motive power is transmitted between the engine 100 and the driving wheels 6. Therefore, there is no restriction between the vehicle speed and the engine rotational speed, so the degree of freedom in setting the operating point of the engine 100 is high.

On the other hand, in series HV running, the entirety of the output of the engine 100 (mechanical energy) is converted into electric energy to be used as a vehicle driving force. Therefore, the transmission efficiency falls due to a loss resulting from the conversion between mechanical energy and electric energy. On the other hand, in the parallel HV running mode, at least part of the output of the engine 100 is used as a vehicle driving force without being converted into electric energy. Accordingly, the transmission efficiency (the utilization efficiency) of the engine output is higher in parallel HV running than in series HV running.

As described above, if the engine efficiency can be enhanced in parallel HV running in which the utilization efficiency of the engine output is high, the effect of improving the fuel economy of the hybrid vehicle 10 is great. On the other hand, in parallel HV miming, the problem lies in how to enhance the engine efficiency while the degree of freedom in setting the operating point of the engine is low.

Figure 5:
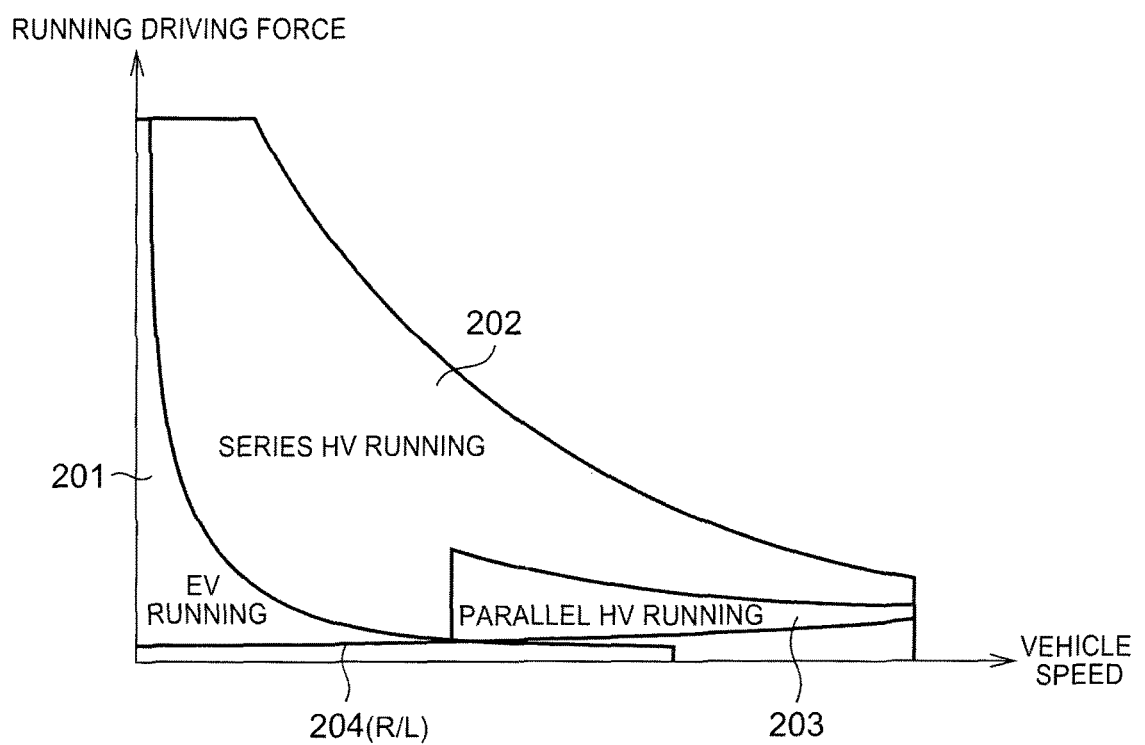
FIG. 5 is a conceptual diagram showing an example of a changeover in running mode in accordance with a running situation.

FIG. 5 is a conceptual diagram showing an example of a changeover in running mode in accordance with the running circumstances in the hybrid vehicle 10.

Referring to FIG. 5, the axis of abscissa of FIG. 5 represents the vehicle speed of the hybrid vehicle 10, and the axis of ordinate of FIG. 5 represents the running driving force (the torque) of the hybrid vehicle 10.

The running power of the hybrid vehicle 10 is calculated as the product of the running driving force (the torque) shown in FIG. 5 and the rotational speed of the output gear 34 shown in FIG. 1.

For example, with a view to making a changeover in running mode in accordance with the running circumstances, the control device 200 prepares an EV running region 201, a series HV running region 202, and a parallel HV running region 203. Then, the control device 200 selects a running mode depending on which one of the running regions 201 to 203 includes a combination of the current vehicle speed and the running driving force, on each cycle of running control.

As a rule, EV running is selected in a low output region with low speed and low load. Thus, the fuel economy can be kept from deteriorating due to low load operation of the engine 100. Incidentally, the running driving force and the vehicle speed are inversely proportional to each other on a borderline of the HV running region 201 that assumes the shape of a curve. Accordingly, the HV running region 201 is equivalently provided in such a manner as to correspond to a region where the running power is lower than a predetermined value.

During running at intermediate vehicle speed, the engine 100 is intermittently operated in such a manner as to appropriately make a changeover between EV running and series HV running or between EV running and parallel HV running, in consideration of a balance between the thermal efficiency of the engine 100 and the charging and discharging loss of the electrical storage device 50. During running at high vehicle speed, series HV running or parallel HV running is appropriately selected in consideration of the efficiency of energy transmission, so the fuel economy can be improved.

FIG. 5 further shows a running load line 204 during running on a flat road. The running load line 204 is equivalent to a set of running driving forces (torques) that are needed at respective vehicle speeds in the case where the hybrid vehicle 10 runs on a flat road at a constant vehicle speed.

Figure 6:
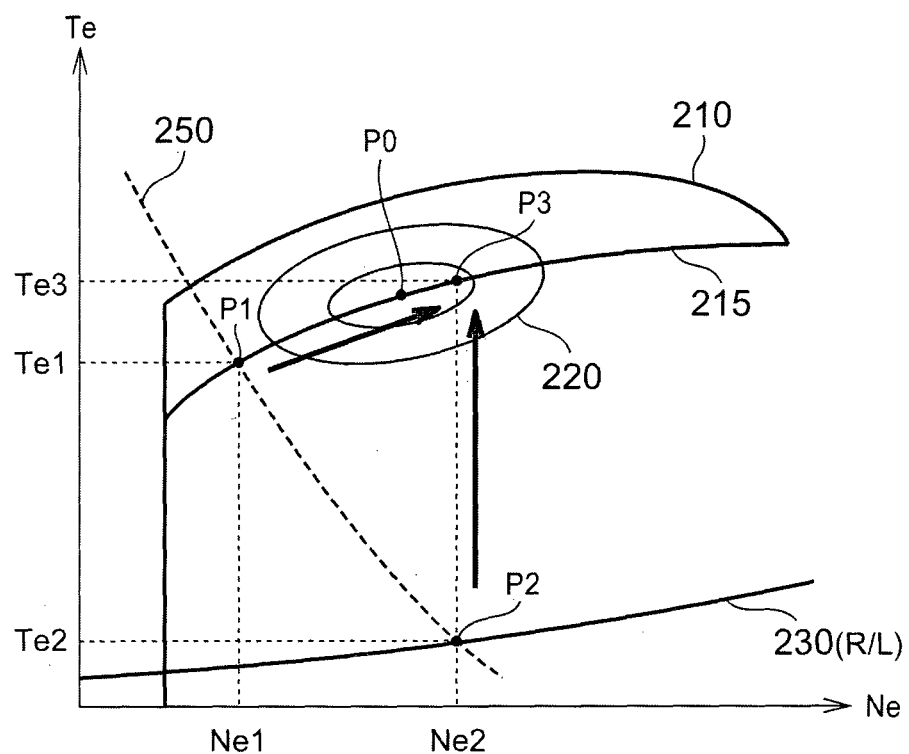
FIG. 6 is a conceptual diagram for illustrating an operating point of an engine shown in FIG. 1.

FIG. 6 is a conceptual diagram for illustrating a relationship between the operating point of the engine shown in FIG. 1 and the efficiency.

Referring to FIG. 6, the axis of abscissa of FIG. 6 represents the engine rotational speed, and the axis of ordinate of FIG. 6 represents the engine torque. As described above, the operating point of the engine 100 is prescribed by a combination of the engine rotational speed and the engine torque.

FIG. 6 shows a maximum torque line 210 and an equivalent fuel consumption line 220. The maximum torque line 210 is defined in advance as a set of operating points at which maximum torques that can be output by the engine 100 at respective engine rotational speeds are output. The equivalent fuel consumption line 220 is a set of operating points with the same fuel economy, and depicts an ellipse. A plurality of the equivalent fuel consumption lines indicate that the fuel economy is improved as the distance to the center of the ellipse decreases.

An equivalent power line 250 is a set of operating points with the same output power of the engine 100. Accordingly, when a power required of the engine 100 (an required engine power Pe) is determined, the operating point of the engine 100 can be determined on the equivalent power line 250 corresponding to the required engine power Pe.

An optimal fuel economy operating line 215 is expressed as a set of operating points at which the amount of fuel consumed by the engine 100 is minimized for the same engine output power. The optimal fuel economy operating line 215 can be uniquely determined in advance based on an experimental result or the like.

Accordingly, the fuel economy of the engine 100 can be improved by setting the operating point of the engine on the optimal fuel economy operating line 215 for a change in the output power of the engine. That is, it is preferable, from the standpoint of fuel economy, to set the operating point of the engine 100 in accordance with an intersection point of the equivalent power line 250 corresponding to the required engine power Pe and the optimal fuel economy operating line 215.

Furthermore, an operating point P0 at which the thermal efficiency of the engine 100 is maximized, namely, the engine efficiency is maximized exists on the optimal fuel economy operating line 215. Accordingly, when the engine 100 operates in accordance with the operating point P0, the fuel economy is improved to a maximum possible extent.

FIG. 6 shows a running load line 230. The torque value at each engine rotational speed on the running load line 230 is balanced with the running resistance at the time when the hybrid vehicle 10 runs on a flat road at a constant vehicle speed in accordance with the engine rotational speed. That is, the running load line 230 corresponds to a set of operating points for outputting an engine torque that is balanced with the running resistance during running on a flat road.

A case where the hybrid vehicle 10 runs on a flat road at a constant vehicle speed while the electrical storage device 50 is not charged/discharged will now be considered. The operating point for allowing the engine 100 to output the running power in this case is located on the running load line 230. In the parallel HV running mode, the engine rotational speed is determined in accordance with the constant vehicle speed. In this case, if it is assumed that the engine rotational speed Ne=Ne2, an operating point P2 (Te=Te2) at which the engine rotational speed is Ne2 on the running load line 230 is an operating point of the engine 100 at which the electrical storage device 50 is not charged/discharged. The operating point P2 greatly deviates from the optimal fuel economy operating line 215, so the engine efficiency decreases.

On the other hand, in order to obtain the same engine output power as at the operating point P2 in series HV running, an operating point P1 equivalent to an intersection point of the equivalent power line 250 including the operating point P2 and the optimal fuel economy operating line 215 can be selected. The engine efficiency at the operating point P1 is higher than the engine efficiency at the operating point P2.

However, in parallel HV running, the control of setting the engine output power higher than the running power and absorbing this difference in power by charging the electrical storage device 50 can also be executed. For example, the engine output can be increased in such a manner as to move from the operating point P2 to the operating point P3. That is, the engine efficiency during parallel HV running can be expected to be enhanced by enhancing the degree of freedom in charging and discharging the electrical storage device 50, especially the degree of freedom on the charging side.

By the same token, in the series HV running mode as well, an operating point with better fuel economy can be set on the optimal fuel economy operating line 215 by changing the engine output power. For example, the engine output power can be increased to approach the operating point P0 from the operating point P1.

As described above, from the standpoint of the effect of improving fuel economy in the hybrid vehicle that runs while making a changeover between series HV running in which the degree of freedom of the engine operating point is high and parallel HV running in which the engine operating point is restrained, it is important to enhance the engine efficiency during parallel HV running in which the transmission efficiency is high. Accordingly, in the hybrid vehicle according to the present first embodiment of the invention, engine output control as described later is executed to adjust the SOC with a view to improving the fuel economy.

Figure 7:
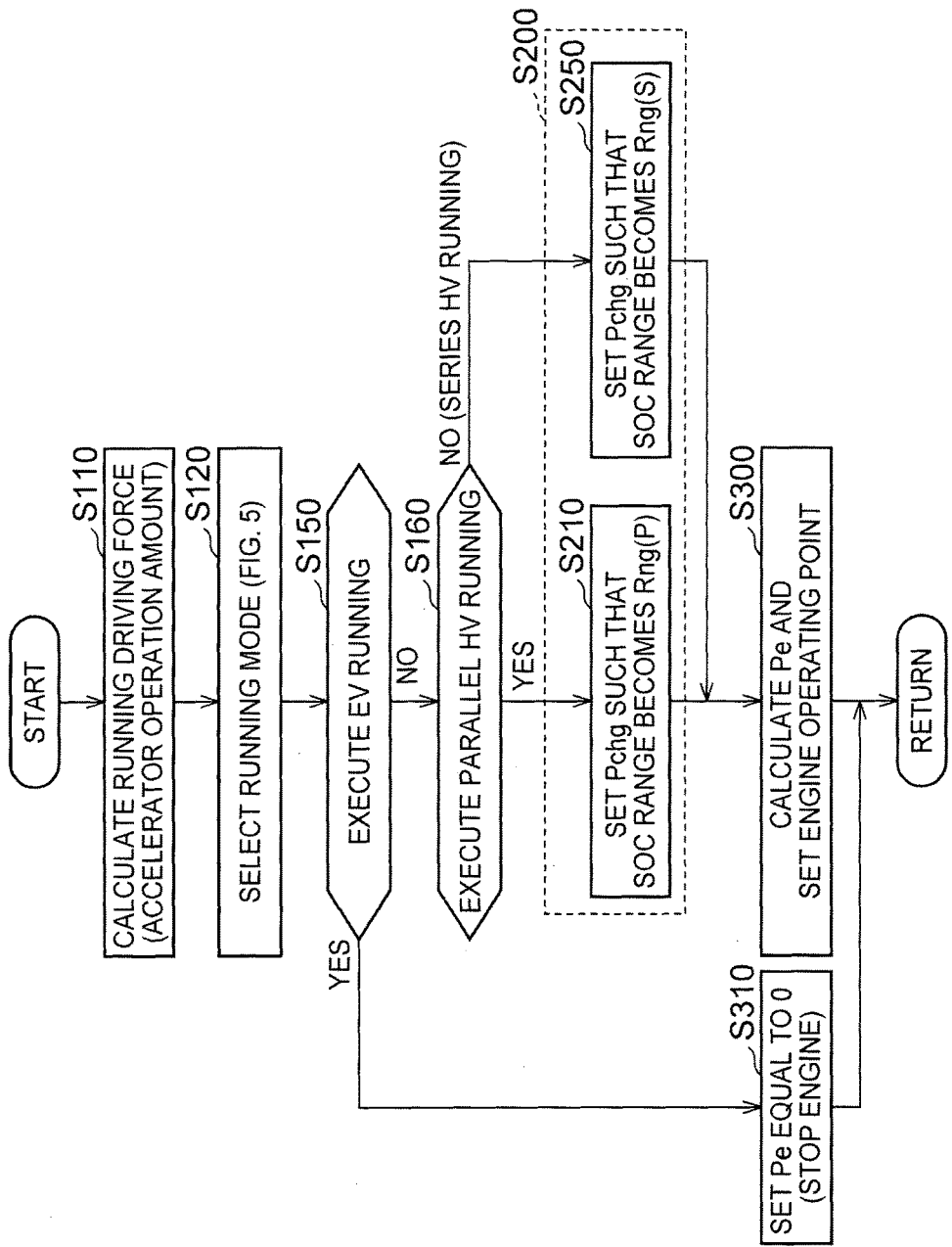
FIG. 7 is a flowchart for illustrating engine output control in a hybrid vehicle according to the first embodiment of the invention.

FIG. 7 is a flowchart for illustrating engine output control combined with the adjustment of the SOC in the hybrid vehicle according to the embodiment of the invention. A control processing according to the flowchart shown in FIG. 7 is repeatedly executed by the control device 200 on a predetermined cycle.

Referring to FIG. 7, in step S110, the control device 200 calculates a running driving force that is needed for the hybrid vehicle 10 to run. For example, the running driving force (the torque) is calculated based on an amount of operation of an accelerator pedal by the driver and a vehicle speed. Furthermore, a power (a running power Pr*) that is needed for the hybrid vehicle 10 to run is obtained as a product of the calculated running driving force and a rotational speed of the output gear 34 (FIG. 1).

In step S120, the control device 200 selects a running mode based on the vehicle speed and the running driving force calculated in step S110. For example, one of EV running, series HV running, and parallel HV running is selected in accordance with the classification of the running regions 201 to 203 shown in FIG. 5.

In step S150 and step S160, the control device 200 executes a process of making a distinction among the running modes. More specifically, it is determined in step S150 whether or not the running mode is EV running, and it is determined in step S160 whether or not the running mode is parallel HV running.

If EV running is selected (if YES in S150), the control device 200 advances the processing to step S310. In EV running, the engine 100 is held stopped (Pe=0) in step S310.

If HV running is selected (if NO in S150), the control device 200 executes step S200 for controlling the SOC. Step S200 includes step S210 that is executed if parallel HV running is selected (if YES in S160), and step S250 that is executed if series HV running is selected (if NO in S160).

Figure 8:
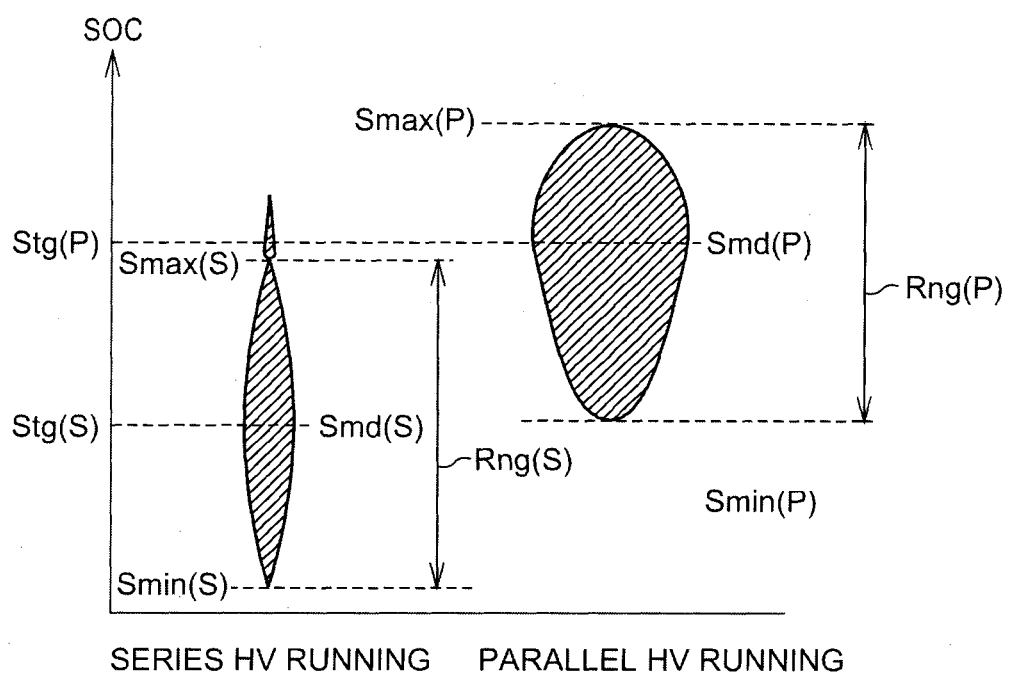
FIG. 8 is a conceptual diagram for making a comparison between SOC control in series HV running and SOC control in parallel HV running.

In step S210, the control device 200 sets a required charging and discharging power Pchg for the engine 100 such that the SOC is held within an SOC range Rng(P) shown in FIG. 8. By contrast, in step S250, the control device 200 sets the required charging and discharging power Pchg such that the SOC is held within an SOC range Rng(S) shown in FIG. 8.

FIG. 8 is a conceptual diagram for making a comparison between SOC control in series HV running and SOC control in parallel HV running in the hybrid vehicle according to the present first embodiment of the invention. The axis of ordinate of FIG. 8 represents the SOC of the electrical storage device 50, and a group of parameters including the SOC ranges Rng(P) and Rng(S) for SOC control during series HV running and parallel HV running are shown in the drawing.

Furthermore, in FIG. 8, SOC distributions that are obtained as a result of SOC control during series HV running and parallel HV running are indicated as hatched regions respectively. The width of each of the hatched regions indicates the frequency of emergence (the frequency distribution) of the SOC at a corresponding one of the SOC's. Incidentally, the details of FIG. 8 will be described later.

Referring again to FIG. 7, the required charging and discharging power Pchg indicates the charging and discharging electric power of the electrical storage device 50 for controlling the SOC of the electrical storage device 50. Incidentally, it will be assumed hereinafter that the required charging and discharging power Pchg is set larger than 0 in the case where the electrical storage device 50 is urged to be discharged, and that the required charging and discharging power Pchg is set smaller than 0 in the case where the electrical storage device 50 is urged to be charged.

In step S300, the control device 200 calculates the required engine power Pe based on the running power Pr* and the required charging and discharging power Pchg. For example, the required engine power Pe can be calculated as Pr*−Pchg. The engine 100 is controlled in accordance with the required engine power Pe. Thus, the power that is obtained by adding/subtracting the power (Pchg) equivalent to the charging and discharging electric power of the electrical storage device 50 to/from the running power Pr* is output from the engine 100.

The electrical storage device 50 is charged/discharged in accordance with the deviation of the running power from the output power of the engine 100. That is, the electrical storage device 50 can be controlled to be charged/discharged in accordance with the required charging and discharging power Pchg, by adjusting the output of the engine 100. It is therefore understood that the output of the engine 100 is controlled in consideration of the intention of holding the SOC of the electrical storage device 50 within the aforementioned SOC range Rng(P) or Rng(S).

When the required engine power Pe is calculated in step S300, the operating point of the engine 100 is set in accordance with the required engine power Pe. Furthermore, the control device 200 controls the throttle opening degree, the ignition timing, the fuel injection timing, the fuel injection amount, the operating state of an intake valve, and the like of the engine 100 such that the engine 100 operates at the set operating point.

During parallel HV running in which the engine rotational speed Ne is restrained, an engine torque is obtained in accordance with the required engine power Pe, so the operating point of the engine 100 is set. During parallel HV running, the required charging and discharging power Pchg is set smaller than 0, and the required engine power Pe is made higher than the running power Pr*, so the engine operating point can be set in such a manner as to enhance the engine efficiency in FIG. 6. This is equivalent to changing the engine operating point from P2 toward P3. Thus, the engine efficiency is enhanced with the SOC held within the SOC range Rng(P).

On the other hand, during series HV running, the operating point of the engine 100 can be set on the optimal fuel economy operating line 215 shown in FIG. 6, in accordance with the required engine power Pe. More specifically, in FIG. 6, the operating point of the engine 100 is set as an intersection point of the equivalent power line 250 corresponding to the required engine power Pe and the optimal fuel economy operating line 215.

Next, referring again to FIG. 8, SOC control in parallel HV running and SOC control in series HV running will be compared with each other in detail.

The SOC of the electrical storage device 50 is controlled by setting the required charging and discharging power Pchg of the electrical storage device 50 based on a comparison between the current SOC and an SOC control target.

In parallel HV running, the required charging and discharging power Pchg is set such that the SOC is confined within the SOC range Rng(P). The SOC range Rng(P) is equivalent to a range from a control upper limit Smax(P) for SOC control to a control lower limit Smin(P) for SOC control. The SOC range Rng(P) includes an SOC control target center Stg(P) during parallel HV running.

By the same token, in series HV running, the required charging and discharging power Pchg is set such that the SOC is confined within the SOC range Rng(S). The SOC range Rng(S) is equivalent to a range from a control upper limit Smax(S) of the SOC to a control lower limit Smin(S) of the SOC during series HV running. The SOC range Rng(S) includes an SOC control target center Stg(S) during series HV running.

Incidentally, when the SOC approaches the control upper limit Smax(S) or Smax(P), the electrical storage device 50 is restrained from being charged in addition to the setting of the aforementioned required charging and discharging power Pchg. Preferably, when the SOC reaches the control upper limit Smax(S) or Smax(P), the electrical storage device 50 is prohibited from being charged while regenerative energy is prohibited from being recovered. Under such restrictions, the required engine power Pe is set such that the running power Pr* can be output while the electric power generated by the motor-generators MG1 and MG2 is restricted or the motor-generators MG1 and MG2 are prohibited from generating an electric power.

As shown in FIG. 8, the SOC control upper limit Smax(P) during parallel HV running is higher than the SOC control upper limit Smax(S) during series HV running. Accordingly, the SOC range Rng(P) includes a region on the SOC side that is higher than the SOC range Rng(S).

Thus, the SOC range is shifted more toward the low SOC side during series HV running than during parallel HV running. Besides, the SOC control target center Stg(S) during series HV running is lower than the control target center Stg(P) during parallel HV running.

Figure 9:
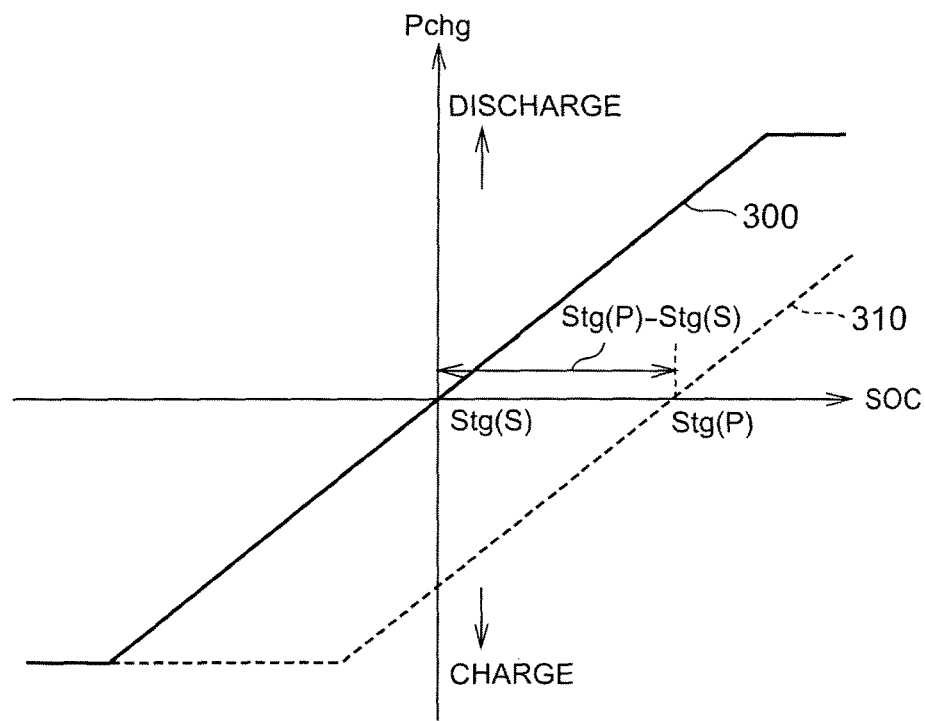
FIG. 9 is a graph showing a first example of a relationship between an SOC of an electrical storage device and a required charging and discharging power.

FIG. 9 is a graph showing a first example of a relationship between the SOC of the electrical storage device 50 and the required charging and discharging power Pchg.

Referring to FIG. 9, during series HV running, the required charging and discharging power Pchg is set in accordance with a comparison between the current SOC and the SOC control target center Stg(S), according to a preset characteristic line 300. That is, the required charging and discharging power Pchg is set equal to 0 when SOC=Stg(S). Furthermore, the required charging and discharging power Pchg is set larger than 0 (on the discharging side) when SOC>Stg(S). On the other hand, the required charging and discharging power Pchg is set smaller than 0 (on the charging side) when SOC<Stg(S).

By contrast, during parallel HV running, the required charging and discharging power Pchg is set according to a preset characteristic line 310. The characteristic line 310 is obtained by shifting the characteristic line 300 toward the high SOC side in accordance with a difference (Stg(P)−Stg(S)) between the control target centers. According to the characteristic line 310, the required charging and discharging power Pchg is set larger than 0 in such a manner as to discharge the electrical storage device 50 when SOC>Stg(P). On the other hand, the required charging and discharging power Pchg is set smaller than 0 in such a manner as to charge the electrical storage device 50 when SOC<Stg(P).

Between the characteristic lines 300 and 310, the relationship between a deviation ΔSOC of the SOC from the SOC control target center Stg(S) or Stg(P) (ΔSOC=SOC−Stg(S) or ΔSOC=SOC−Stg(P)) and the required charging and discharging power Pchg is common to series HV running and parallel HV running. That is, the difference in the required charging and discharging power Pchg for the same SOC between series HV running and parallel HV running results from the difference between the SOC control target center Stg(S) and the SOC control target center Stg(P).

The SOC distribution obtained as a result of SOC control as described above, which is indicated by each of the hatched regions in FIG. 8, is obtained by, for example, sampling the past record of the SOC under the aforementioned SOC control on a predetermined cycle. The sampling for obtaining the SOC distribution is preferably carried out for a long time. For example, sampling is preferably carried out in a continuous manner while the same battery is in use. It should be noted, however, that sampling may be cleared during the maintenance of the vehicle.

Due to the SOC control through the setting of the required charging and discharging power Pchg, the SOC distribution during series HV running is confined within the SOC range Rng(S). On the other hand, the SOC distribution during parallel HV running is confined within the SOC range Rng(P). Accordingly, the SOC distribution during series HV running is located more toward the low SOC side than the SOC distribution during parallel HV running. To put it the other way around, the SOC distribution during parallel HV running includes a region that is located more toward the high SOC side than the SOC distribution during series HV running.

The charging available capacity of the electrical storage device 50 during parallel HV running can be enhanced by restraining the SOC during series HV running. Then, during parallel HV running, the SOC range Rng(P) is set on the high SOC side, so the degree of freedom on the charging side of the electrical storage device 50 in setting the engine output (the required engine power Pe) can be enhanced.

As a result, it is easy to set the engine operating point with the electrical storage device 50 charged in such a manner as to enhance the engine efficiency, as described with reference to FIG. 6, during parallel HV running with an excellent transmission efficiency.

It should be noted, however, that it is also possible to control the charging and discharging of the electrical storage device 50 in such a manner as to temporarily permit the electrical storage device 50 from being charged beyond the normal SOC range Rng(S), with a view to ensuring an amount of energy recovered by the electrical storage device 50, for example, when the hybrid vehicle 10 has run downslope for a long time during series HV running, as shown in FIG. 8 as well. That is, the SOC range Rng(S) according to the present embodiment of the invention is equivalent to the range between the SOC control upper limit Smax(S) and the SOC control lower limit Smin(S) in normal SOC control except in the case where the restriction on charging and discharging is temporarily mitigated under a special condition. As exemplified in FIG. 8, the SOC distribution in the range of SOC>Smax(P) resulting from the temporary mitigation as described above can be distinguished from the SOC distribution in the SOC range Rng(S), due to the discontinuity of the frequency distribution or the like. That is, the SOC control upper limit Smax(S) indicating the upper limit of the SOC range Rng(S) does not mean the maximum among SOC past record values that have actually emerged, but means the upper limit of the SOC control range resulting from the engine output.

Figure 10:
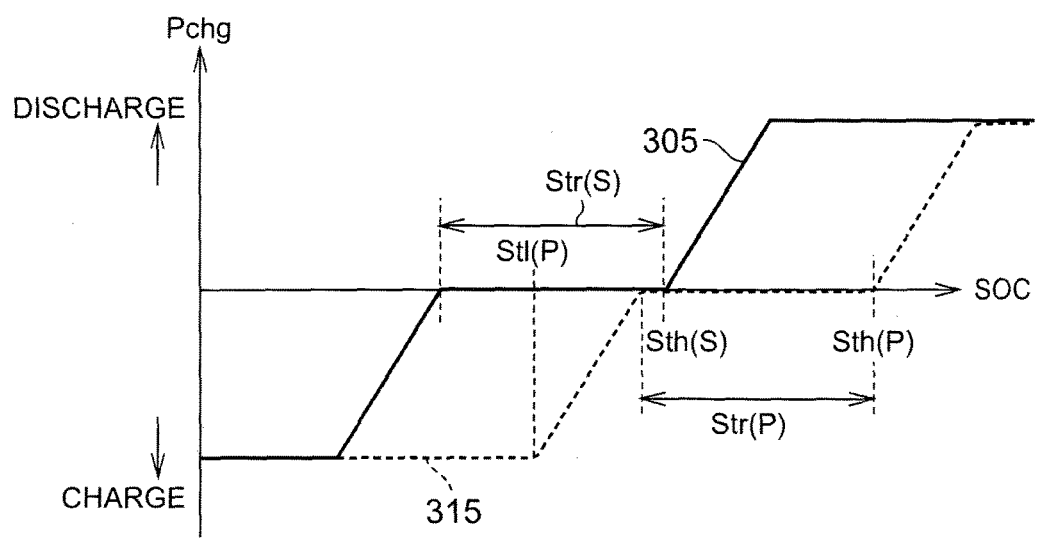
FIG. 10 is a graph showing a second example of the relationship between the SOC of the electrical storage device and the required charging and discharging power.

FIG. 10 shows a second example of a relationship between the SOC of the electrical storage device 50 and the required charging and discharging power Pchg. In the example of FIG. 10, the electrical storage device 50 is controlled in such a manner as to be charged/discharged when a deviation from a certain control target range Str occurs instead of a deviation from the single control target centers Stg(S) and Stg(P).

Referring to FIG. 10, during series HV running, the required charging and discharging power Pchg is set in accordance with a comparison between the current SOC and the SOC control target range Str(S), according to a preset characteristic line 305. That is, the required charging and discharging power Pchg is set equal to 0 when the SOC is within the SOC control target range Str(S). By contrast, the required charging and discharging power Pchg is set larger than 0 (on the discharging side) when the SOC becomes higher than the control target range Str(S). On the other hand, the required charging and discharging power Pchg is set smaller than 0 (on the charging side) when the SOC becomes lower than the SOC control target range Str(S). The SOC control target range Str(S) is set in such a manner as to include the control target center Stg(S) in FIG. 9.

By contrast, during parallel HV running, the required charging and discharging power Pchg is set according to a preset characteristic line 315. The characteristic line 315 is obtained by shifting the characteristic line 300 toward the high SOC side. According to the characteristic line 315, the required charging and discharging power Pchg is set equal to 0 when the SOC is within the SOC control target range Str(P). By contrast, the required charging and discharging power Pchg is set larger than 0 (on the discharging side) when the SOC becomes higher than the control target range Str(P), whereas the required charging and discharging power Pchg is set smaller than 0 (on the charging side) when the SOC becomes lower than the SOC control target range Str(P). The SOC control target range Str(P) is set in such a manner as to include the control target center Stg(P) in FIG. 9.

Incidentally, the SOC control upper limit Smax(S) shown in FIG. 8 is located more toward the high SOC side than the control target range Str(S), and the SOC control upper limit Smax(P) is located more toward the high SOC side than the control target range Str(P). By the same token, the SOC control lower limit Smin(S) is located more toward the low SOC side than the control target range Str(S), and the SOC control lower limit Smin(P) is located more toward the low SOC side than the control target range Str(P).

The control target range Str(S) is provided such that the upper limit Sth(S) becomes lower than the upper limit Sth(P) of the control target range Str(P). Representatively, as shown in FIG. 10, the control target range Str(S) is provided in such a manner as to shift the control target range Str(P) toward the low SOC side. By thus setting the control target range Str(S) and the control target range Str(P), the SOC distribution during series HV running can be located more toward the low SOC side than the SOC distribution during parallel HV running as shown in FIG. 8, even when the required charging and discharging power Pchg is set with reference to FIG. 10.

That is, even when the required charging and discharging power Pchg is set using FIG. 10, the SOC distribution during series HV running can be confined within the SOC range Rng(S), whereas the SOC distribution during parallel HV running can be confined within the SOC range Rng(P).

As described hitherto, the SOC control target in SOC control according to the present embodiment of the invention can include both the control target centers Stg(P) and Stg(S) as single values and the control target ranges Str(P) and Str(S). Besides, both the characteristic lines 300 and 310 and the characteristic lines 305 and 315 ensure the region where the required charging and discharging power Pchg for the same SOC is larger on the charging side during parallel HV running than during series HV running.

Incidentally, the characteristics of the required charging and discharging power Pchg for the difference between the current SOC and the SOC control target are common to the characteristic lines 300 and 310 shown in FIG. 9 and the characteristic lines 305 and 315 shown in FIG. 10. Accordingly, the required charging and discharging power Pchg can be set according to a common setting map or a common arithmetic expression by shifting the control target centers Stg(P) and Stg(S) or the control target range Str(P) and Str(S) between parallel HV running and series HV running.

Figure 11:
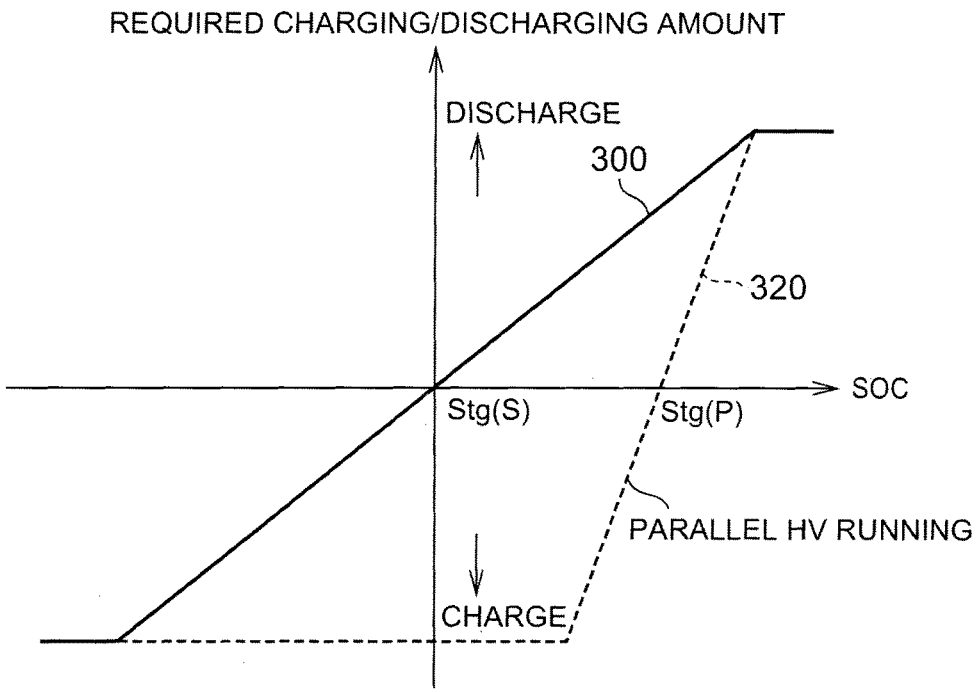
FIG. 11 is a graph showing a third example of the relationship between the SOC of the electrical storage device and the required charging and discharging power.

FIG. 11 shows a third example of a relationship between the SOC of the electrical storage device and the required charging and discharging power. Referring to FIG. 11, during series HV running, the required charging and discharging power Pchg is set in accordance with a comparison between the current SOC and the SOC control target center Stg(S), according to the same characteristic line 300 as in FIG. 9.

By contrast, during parallel HV running, the required charging and discharging power Pchg is set in accordance with a comparison between the current SOC and the control target center Stg(P), according to a characteristic line 320.

During parallel HV running, the characteristic line 320 is obtained not by simply shifting the characteristic line 300 toward the high SOC side as is the case with the characteristic line 310 (FIG. 9), but by modifying the setting of the required charging and discharging power Pchg for the SOC deviation ΔSOC toward the charging side of the electrical storage device 50 in the region where SOC<Stg(P). That is, according to the characteristic line 320, there is created a margin for generating a larger amount of charging electric power of the electrical storage device 50 in the region where SOC<Stg(P). Besides, according to the characteristic lines 300 and 320, the region where the required charging and discharging power Pchg for the same SOC and the same SOC deviation (ΔSOC) is larger on the charging side during parallel HV running than during series HV running is ensured.

As described hitherto, with the hybrid vehicle 10 according to the first embodiment of the invention, as shown in FIGS. 8 to 11, the required charging and discharging power Pchg and/or the SOC control upper limit are/is changed between series HV running and parallel HV running, so the SOC range during parallel HV running is located more toward the high SOC side than the SOC range during series HV running. As a result, the SOC during series HV running is lower than the SOC during parallel HV running. Thus, the SOC during series HV running can be purposefully held low, so the margin for charging the electrical storage device 50 during parallel HV running can be enhanced.

Thus, the degree of freedom in charging the electrical storage device 50 is enhanced during parallel HV running in which the utilization efficiency (the transmission efficiency) of the engine output is high, so the degree of freedom in setting the engine operating point can be enhanced. Thus, it is easy to set the engine operating point in such a manner as to enhance the engine efficiency as the electrical storage device 50 is charged. Therefore, the fuel economy of the hybrid vehicle 10 can be improved.

Incidentally, as shown in FIG. 8, the event that the SOC range during parallel HV running includes a higher SOC region than the SOC range during series HV running can be defined by a phenomenon that the relationship in height between the upper limits of the SOC ranges Rng(P) and Rng(S) (i.e., the SOC control upper limits Smax(P) and Smax(S)) or the SOC during parallel HV running is distributed also in a higher SOC region than the upper limit of the SOC range Rng(S) during series HV running (i.e., the SOC control upper limit Smax(S)).

Besides, owing to SOC control according to the aforementioned SOC control target (the control target center or the control target range), a most frequent SOC value with the highest frequency distribution corresponds to the SOC control target. Accordingly, the event that the SOC range during parallel HV running includes a higher SOC region than the SOC range during series HV running can be defined also by the event that a most frequent SOC value Smd(P) during parallel HV running is higher than a most frequent SOC value Smd(S) during series HV running in the SOC distribution (FIG. 8), or the event that the SOC average during parallel HV running is higher than the SOC average during series HV running.

Referring again to FIG. 6, the operating point for enhancing the engine efficiency in parallel HV running is set in such a manner as to increase the engine torque Te from an operating point corresponding to the running power (e.g., P2 in FIG. 6) while maintaining the engine rotational speed Ne. Accordingly, if it is assumed that the change in the engine torque resulting from this setting of the operating point is denoted by ΔTe, the power that is excessively output by the engine 100 with respect to the running power is denoted by ΔTe×Ne. For example, at an operating point P3 shown in FIG. 6, the output power of the engine 100 is excessive with respect to the necessary running power by ΔPe=(Te3−Te2)× Ne2.

On the other hand, during engine output control according to the first embodiment of the invention, the required charging and discharging power Pchg during parallel HV running is set in such a manner as to enlarge the charging electric power of the electrical storage device 50. However, when the required charging and discharging power Pchg set for SOC control becomes excessive with respect to the aforementioned value ΔPe (i.e., |Pchg|>ΔPe), the engine operating point is set above the optimal fuel economy operating line 215 in FIG. 6, so there is an apprehension that the effect of improving fuel economy may be curbed.

Accordingly, in the modification example of the first embodiment of the invention, SOC control for further executing an arbitration processing for making a comparison between the operating point according to the required charging and discharging power Pchg for SOC control and the optimal fuel economy operating line 215 in parallel HV running will be described.

Figure 12:
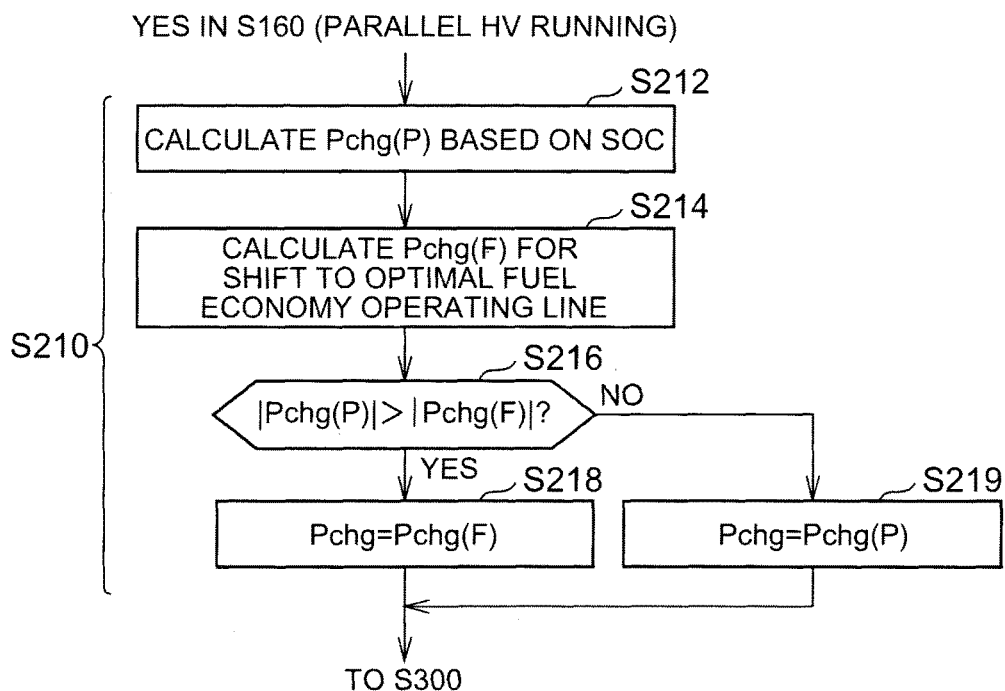
FIG. 12 is a flowchart for illustrating SOC control during parallel HV running in a hybrid vehicle according to a modification example of the first embodiment of the invention.

FIG. 12 is a flowchart for illustrating SOC control during parallel HV running in a hybrid vehicle according to the modification example of the first embodiment of the invention.

Referring to FIG. 12, in the hybrid vehicle according to the modification example of the first embodiment of the invention, the process of step S210 (FIG. 7) for setting the required charging and discharging power Pchg during parallel HV running is executed in such a manner as to include steps S212 to S219.

During parallel HV running (if YES in the determination of S160 (FIG. 7)), the control device 200 calculates a charging and discharging power Pchg(P) for SOC control based on a current SOC in step S212. The charging and discharging power Pchg(P) can be calculated according to, for example, any one of the characteristic lines 310, 315 and 320 shown in FIGS. 9 to 11.

In step S214, the control device 200 calculates a charging and discharging power Pchg(F) needed to shift the engine operating point for outputting the running power (Pr*) to the engine operating point on the optimal fuel economy operating line 215, at the same engine rotational speed corresponding to the current vehicle speed. The charging and discharging power Pchg(F) is equivalent to the aforementioned change ΔPe in engine power, which is indicated as the product of the engine rotational speed at the present moment and a change ΔTe in torque resulting from the change in the engine operating point. That is, the change ΔPe in engine power is also equivalent to the difference between the running power (Pr*) and the engine output power at the operating point on the optimal fuel economy operating line 215 according to the engine rotational speed corresponding to the current vehicle speed.

In step S216, the control device 200 makes a comparison between the absolute value of the charging and discharging power Pchg(P) calculated in step S212 and the absolute value of the charging and discharging power Pchg(F) calculated in step S214. If |Pchg(P)|>|Pchg(F)| (if YES in the determination of S216), the control device 200 advances the processing to step S218. On the other hand, if |Pchg(P)|≤|Pchg(F)| (if NO in the determination of S216), the control device 200 advances the processing to step S219.

In step S218, the control device 200 sets the required charging and discharging power Pchg according to the charging and discharging power Pchg(F) that is lower than the charging and discharging power Pchg(P) for SOC control (Pchg=Pchg(F)). Thus, the engine operating point can be kept from separating from the optimal fuel economy operating line 215 of FIG. 6 due to the addition of the required charging and discharging power Pchg.

On the other hand, in step S219, the control device 200 adopts the charging and discharging power Pchg(P) for SOC control, and sets the required charging and discharging power Pchg (Pchg=Pchg(P)). Thus, the engine operating point can be made close to the optimal fuel economy operating line 215 of FIG. 6 within a range according to SOC control.

When the required charging and discharging power Pchg is set in step S218 or S219, the control device 200 ends step S210 (FIG. 7), and advances the processing to step S300 in FIG. 7. Thus, engine output control accompanied by SOC control can be realized as is the case with the first embodiment of the invention.

As described hitherto, with the hybrid vehicle according to the modification example of the first embodiment of the invention, the engine operating point can be set in such a manner as to become as close as possible to the optimal fuel economy operating line 215 (FIG. 6) within the range of SOC control, with the degree of freedom in charging the electrical storage device 50 in SOC control enhanced, during parallel HV running. Thus, the fuel economy of the hybrid vehicle 10 during parallel HV running can be further improved.

In the second embodiment of the invention, an improvement in the fuel economy of a hybrid vehicle that selects a charge depleting (CD) mode in which the state of charge (the SOC) of the electrical storage device is consumed, and a charge sustaining (CS) mode in which the SOC is maintained will be described.

Figure 13:
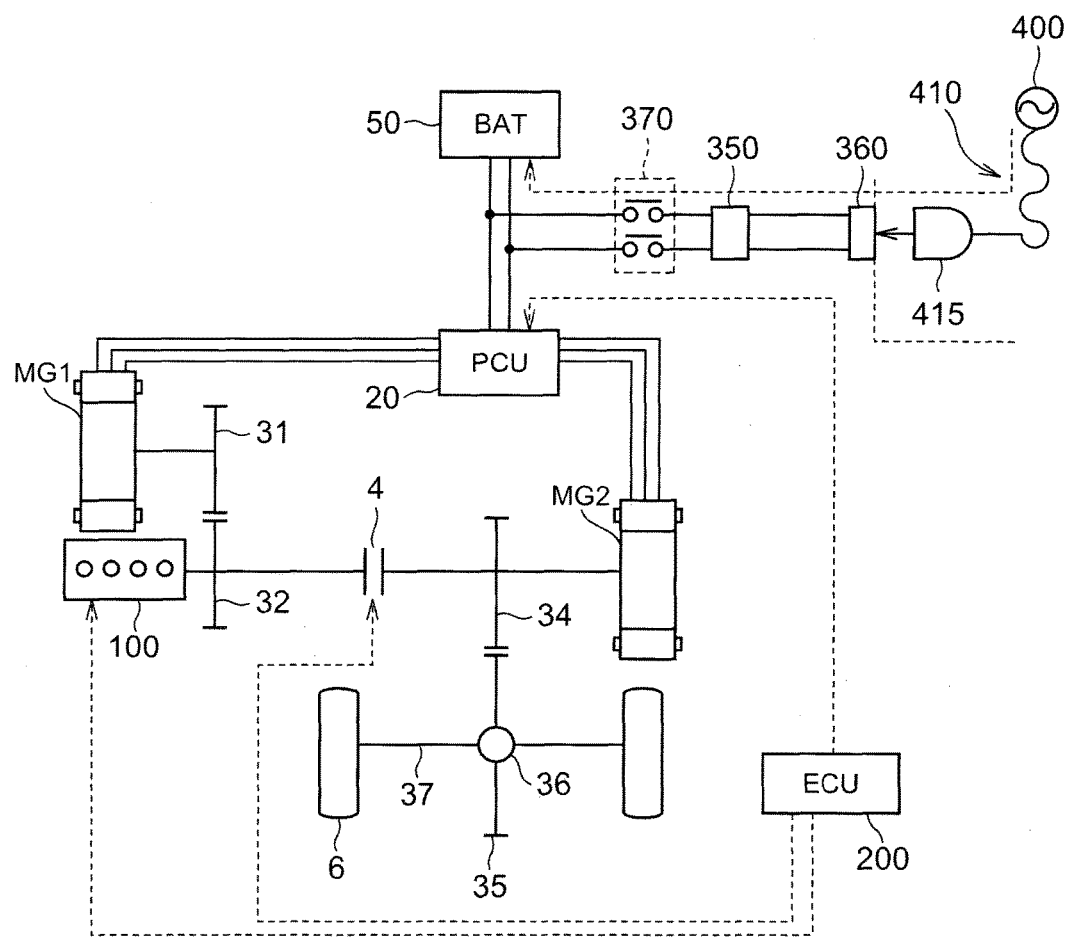
FIG. 13 is a block diagram showing the overall configuration of a hybrid vehicle according to the second embodiment of the invention.

FIG. 13 is a block diagram showing the overall configuration of a hybrid vehicle 10# according to the second embodiment of the invention.

Referring to FIG. 13, in comparison with the hybrid vehicle 10 according to the first embodiment of the invention, the hybrid vehicle 10# further includes a charging device 350, a charging port 360, and a relay 370 as a configuration for charging the electrical storage device 50 through the use of an electric power supply outside the vehicle (hereinafter referred to also as "an external electric power supply"). The charging of the electrical storage device 50 through the use of the external electric power supply will be referred to hereinafter simply as "external charging".

The charging port 360 is an electric power interface for receiving an electric power from a system electric power supply 400 outside the vehicle (hereinafter referred to as an external electric power). The charging port 360 is configured to be connectible to a connector 410 that is connected to the external electric power supply 400. Representatively, the external electric power supply 400 is configured as a system electric power supply. Alternatively, the external electric power supply 400 may be configured as a solar battery system, a fuel cell system, a storage battery system or the like. The operation of the charging device 350 is controlled by a control signal from the control device 200. For example, the operation/stop of the charging device 350 and the charging electric power of external charging are controlled by the control device 200.

Figure 14:
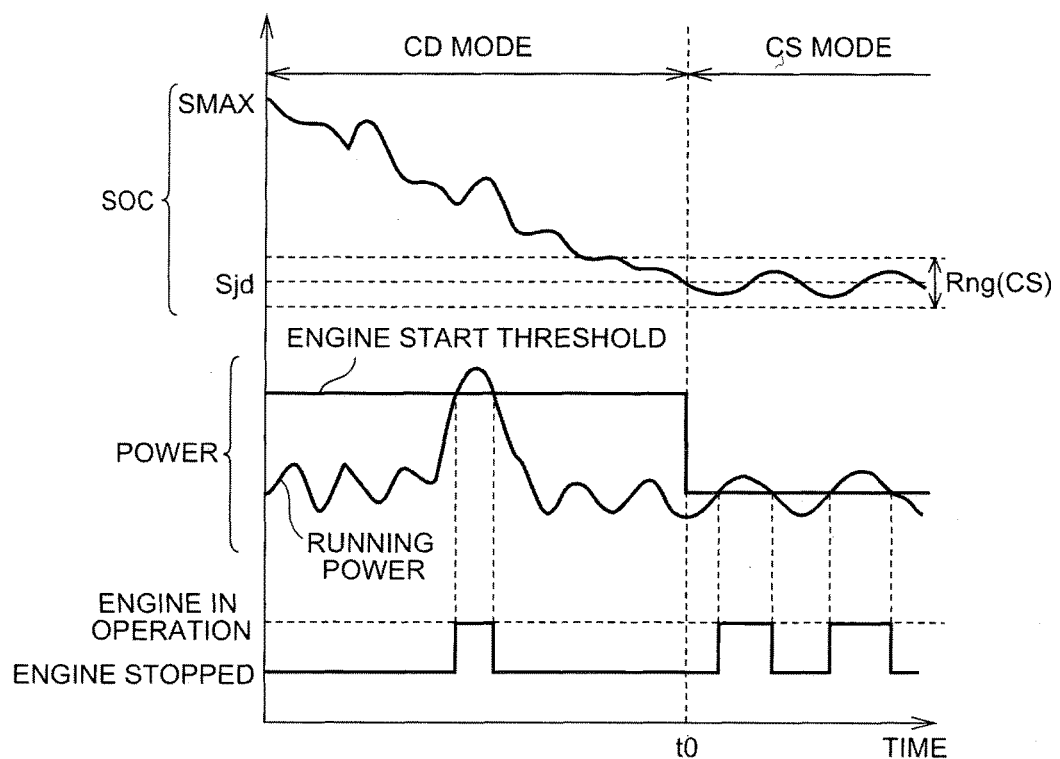
FIG. 14 is a diagram for illustrating a CD mode and a CS mode by comparison.

FIG. 14 is a conceptual diagram for illustrating the CD mode and the CS mode through comparison. Referring to FIG. 14, it is assumed that the running of the hybrid vehicle is started in the CD mode after the electrical storage device 50 is fully charged through external charging (SOC=SMAX).

In the CD mode, the SOC is consumed, and the electric power stored in the electrical storage device 50 is basically consumed. During running in the CD mode, the engine 100 is basically not started to maintain the SOC. Accordingly, in the CD mode, the SOC may temporarily increase due to a regenerative electric power or the like that is recovered during deceleration or the like of the vehicle, but the SOC decreases on the whole as the running distance increases. That is, through the CD mode, the ratio of the period in which the electrical storage device 50 is charged is lower than the ratio of the period in which the electrical storage device 50 is discharged.

By contrast, in the CS mode, the SOC is held within a predetermined range. For example, when the SOC falls to a predetermined value Sjd at a time t1, the CS mode is selected instead of the CD mode. At or after the time t1 when the CS mode is selected, the SOC is held within a predetermined SOC range Rng(CS). Accordingly, in the CS mode, the engine 100 can be started to maintain the SOC. Accordingly, through the CS mode, the ratio of the period in which the electrical storage device 50 is charged is higher than in the CD mode.

Incidentally, although not shown in the drawing in particular, a switch operable by the driver may be provided, and a changeover between the CD mode and the CS mode may be allowed in accordance with the operation of the driver regardless of how the SOC changes.

In the hybrid vehicle 10# shown in FIG. 13, EV running (FIG. 2) is selected when the sum of the running power (Pr*) and the required charging and discharging power (Pchg) is smaller than a predetermined engine start threshold. That is, the engine 100 is stopped, and the hybrid vehicle 10# runs by the output of the motor-generator MG2.

On the other hand, when the sum of the running power (Pr*) and the required charging and discharging power (Pchg) exceeds an engine start threshold, the engine 100 is started to select HV running. During HV running, series HV running or parallel HV running is selected in accordance with, for example, FIG. 5. The engine start threshold in the CD mode is preferably set higher than the engine start threshold in the CS mode.

Accordingly, the EV running region 201 shown in FIG. 5 differs between the CD mode and the CS mode. More specifically, the EV running region 201 is set wider during the CD mode. Thus, in the CD mode, the frequency with which the engine 100 is operated is reduced. Therefore, the hybrid vehicle can run with high energy efficiency mainly through the use of the electric power of the externally charged electrical storage device 50, without consuming fuel.

As described hitherto, in the CD mode as well, when the running power exceeds the engine start threshold in accordance with the operation or the like of the accelerator by the driver, the engine 100 is started. When the running power falls below the threshold after the operation of the engine 100, the engine 100 is stopped again.

On the other hand, in the CD mode, the engine is kept from being started for SOC control. For example, the current SOC value is sequentially set to the SOC control target, so the required charging and discharging power Pchg is set equal to 0 in the CD mode. That is, SOC control is not executed through the adjustment of the engine output as described in the first embodiment of the invention.

Besides, in the CD mode as well, even the running power has not exceeded the engine start threshold, the operation of the engine 100 may be permitted when hot-water heating is required with the engine 100 serving as a heat source, when the engine 100 is warmed up, etc.

In the CS mode, SOC control is executed through the adjustment of the output of the engine 100 in such a manner as to hold the SOC of the electrical storage device 50 within the range Rng(CS). For example, in the CS mode, the engine 100 is required to be started in accordance with a fall in the SOC as well as the running power. On the other hand, in the CS mode as well, the engine 100 is stopped in the case where the sum of the running power (Pr*) and the required charging and discharging power (Pchg) is lower than the engine start threshold.

As described hitherto, in the hybrid vehicle 10#, the CD mode is not limited to EV running in which the hybrid vehicle runs with the engine 100 constantly stopped, and the CS mode is not limited either to HV running in which the hybrid vehicle runs with the engine 100 constantly in operation. In both the CD mode and the CS mode, EV running and HV running are possible.

The hybrid vehicle 10# is basically intended to improve the energy efficiency (the fuel economy) through effective utilization of the electric energy of the electrical storage device 50 by enhancing the frequency of EV running in the CD mode. Accordingly, in the hybrid vehicle 10# according to the second embodiment of the invention, the fuel economy in the CS mode needs to be improved while maintaining the features of the CD mode.

Figure 15:
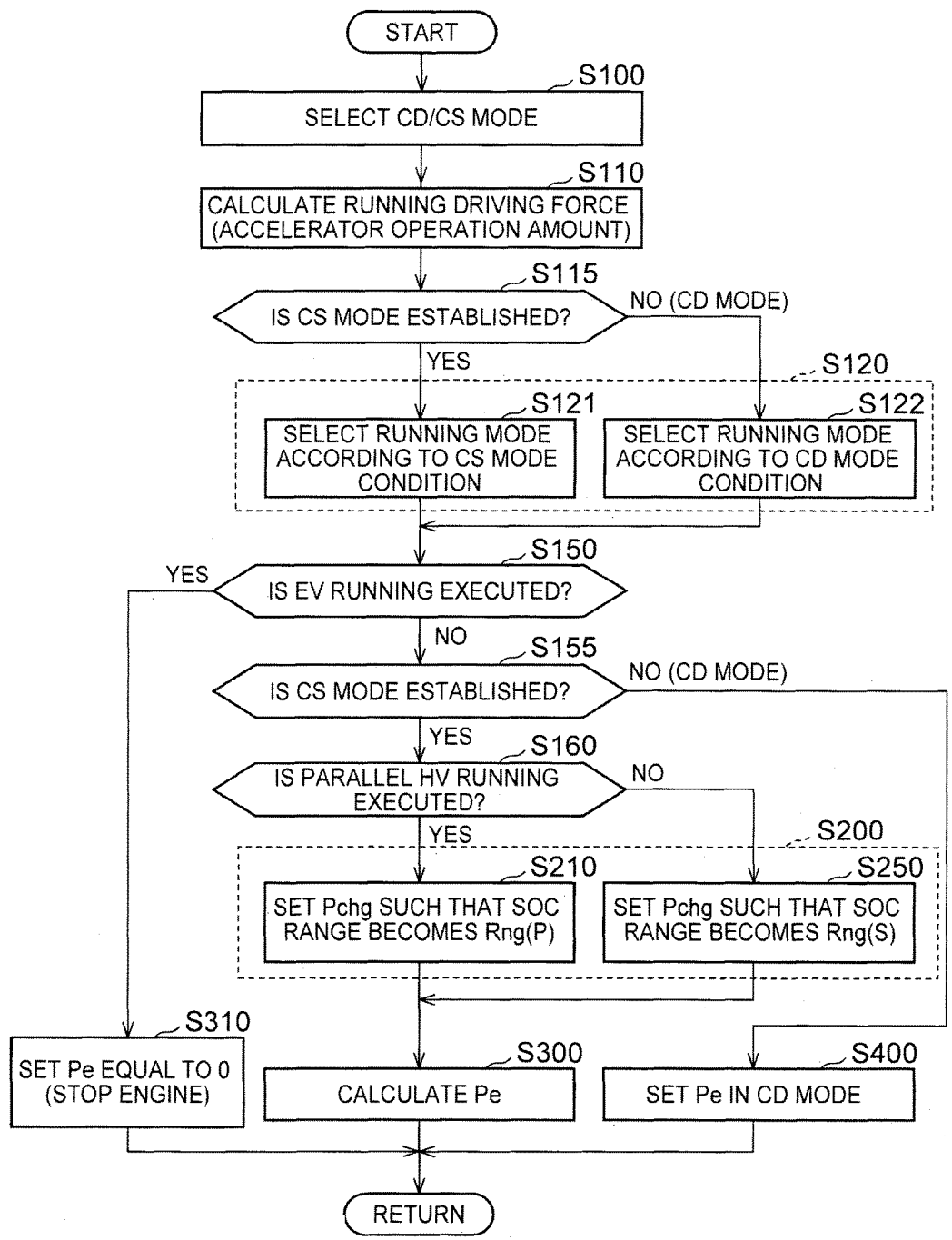
FIG. 15 is a flowchart for illustrating engine output control and SOC control of a hybrid vehicle according to the second embodiment of the invention.

FIG. 15 is a flowchart for illustrating running control in the hybrid vehicle according to the second embodiment of the invention. FIG. 15 shows a processing associated with SOC control and engine output control as running control. The control processing shown in FIG. 15 is executed on a predetermined cycle by the control device 200.

Referring to FIG. 15, the control device 200 selects the CD mode and the CS mode in step S100. For example, in step S100, the CD mode or the CS mode is selected based on the SOC or in accordance with the operation of a selection switch by the driver. In general, one of the CD mode and the CS mode is selected based on the SOC upon the start of the driving of the hybrid vehicle 10#. Then, when the CD mode is selected upon the start of driving, a changeover from the CD mode to the CS mode is made as the SOC falls below a criterial threshold (Sjd), as shown in FIG. 14.

Furthermore, the control device 200 calculates the running driving force and the running power Pr* needed for the running of the hybrid vehicle 10#, in the same step S110 as in FIG. 7. Furthermore, the control device 200 determines in step S115 which one of the CD mode and the CS mode is selected.

The control device 200 selects a running mode corresponding to the running circumstances (EV running/series HV running/parallel HV running) in step S120. Step S120 includes step S121 for selecting the running mode in accordance with a CS mode condition, and step S122 for selecting the running mode in accordance with a CD mode condition.

The CS mode condition in step S121 and the CD mode condition in step S122 are equivalent to, for example, the engine start threshold shown in FIG. 14 and borderlines of the running regions 201 to 203 shown in FIG. 5. As described above, the CD mode condition is set such that the application region of EV running (the EV running region 201 of FIG. 5) becomes wider than that of the CS mode condition. That is, the running regions 201 to 203 are also set separately for the CD mode and the CS mode.

Subsequently, the control device 200 determines, in the same step S150 as in FIG. 7, whether or not EV running is selected. If EV running is selected (if YES in the determination of S150), the engine 100 is stopped. Therefore, the control device 200 advances the processing to step S310, and sets the required engine power Pe equal to 0.

If HV running (series HV running or parallel HV running) is selected (if NO in the determination of S150), the control device 200 determines in step S155 whether or not the CS mode is selected.

If the CS mode is selected, the control device 200 executes the same steps S160, S200 and S300 as in FIG. 7. Accordingly, in the hybrid vehicle 10#, when the CS mode is selected, the required charging and discharging power Pchg and the required engine power Pe are calculated according to the same processing procedure as in the first embodiment of the invention. In consequence, according to the first embodiment of the invention, the SOC range Rng(CS) of FIG. 14 is set to Rng(P) of FIG. 8 during parallel HV running, and is set to Rng(S) of FIG. 8 during series HV running.

Thus, in the CS mode, the SOC range during parallel HV running can be located more toward the high SOC side than the SOC range during series HV running, as is the case with the first embodiment of the invention. That is, the SOC during series HV running is purposefully held low, so the margin for charging the electrical storage device 50 during parallel HV running can be enhanced.

If the CD mode is selected (if NO in the determination of S155), the control device 200 advances the processing to step S400, and sets the required engine power Pe in the CD mode.

For example, in step S400, the required engine power Pe can be set according to the running power Pr in consideration of the transmission efficiency and the like, without generating the power for charging and discharging the electrical storage device 50 (Pchg=0). That is, in series HV running, on the optimal fuel economy operating line 215 of FIG. 6, the engine operating point at which the engine output power is the required engine power Pe is set. Besides, in parallel HV running, the engine operating point at which the engine output power is equivalent to the required engine power Pe is selected at the engine rotational speed according to the current vehicle speed.

In this manner, with the hybrid vehicle according to the second embodiment of the invention, when the CS mode is selected, the degree of freedom in setting the engine operating point can be enhanced such that the efficiency of the engine 100 becomes high during parallel HV running in which the utilization efficiency (the transmission efficiency) of the engine output is high, as is the case with the first embodiment of the invention.

On the other hand, in the CD mode, even when series HV running or parallel HV running is selected, the output of the engine 100 can be controlled according to the running power without including the charging and discharging electric power of the electrical storage device 50. Thus, in the CD mode, SOC control is not executed. As a result, the frequency with which the engine 100 is operated is reduced, so the application region of EV running can be enlarged.

Incidentally, in applying the invention, the configuration of the hybrid vehicle is not limited to the configurational examples of FIGS. 1 and 13. The invention can be provided in common to hybrid vehicles that run while making a changeover among a plurality of running modes including series HV running and parallel HV running.

In particular, SOC control (engine output control) according to the first embodiment of the invention, the modification example thereof, and the second embodiment of the invention takes into account that the electrical storage device 50 needs to be charged to set the engine operating point in such a manner as to enhance the engine efficiency in parallel HV running, and is therefore suited for the configuration in which the engine operating point is limited. Therefore, FIGS. 1 and 13 exemplify the configuration in which no transmission is arranged in the mechanical motive power transmission path between the engine 100 and the driving wheels 6, and the speed ratio is fixed. It should be noted, however, that the invention is not absolutely required to be applied to this configuration. For example, even for a configuration in which a stepped transmission whose selectable selection ratios are gradual (discontinuous) is arranged on the aforementioned motive power transmission path, the engine operating point during parallel HV running is limited according to the engine rotational speed. Therefore, SOC control (engine output control) according to the first embodiment of the invention, the modification example thereof, and the second embodiment of the invention can be applied.

Incidentally, the first embodiment of the invention and the modification example thereof exemplify the hybrid vehicle 10 in which the running mode is changed over among series HV running, parallel HV running and EV running. However, as long as both the running modes, namely, series HV running and parallel HV running are available, the availability of other running modes is optional. For example, in the case where the EV running mode is not provided, or even in the case where running modes other than the foregoing are further provided, SOC control (engine output control) according to the first embodiment of the invention and the modification example thereof can be applied.

Besides, in the second embodiment of the invention, the configuration enabling external charge has been described as a representative example of the hybrid vehicle that runs with the CS mode or the CD mode selected. However, even a hybrid vehicle that does not have a configuration for external charge can be provided with the CS mode and the CD mode. That is, SOC control (engine output control) according to the second embodiment of the invention can also be applied to all the hybrid vehicles that run with the CS mode and the CD mode selected, regardless of whether or not there is a configuration for external charge.

The embodiments of the invention disclosed herein should be considered to be exemplary in all respects and not restrictive. The scope of the invention is not defined by the foregoing description but by the claims. The invention is intended to encompass all modifications that are equivalent in significance and scope to the claims.

What is claimed is:

1. A hybrid vehicle comprising:
   an internal combustion engine;
   a first rotating electrical machine that is mechanically coupled to the internal combustion engine;
   a second rotating electrical machine that is mechanically coupled to a driving wheel;
   a clutch that is configured to make a changeover between a coupling state for forming a mechanical motive power transmission path between the internal combustion engine and the driving wheel and a decoupling state for decoupling the motive power transmission path;
   an electrical storage device that gives electric power to the first rotating electrical machine and the second rotating electrical machine and receives electric power from the first rotating electrical machine and the second rotating electrical machine; and
   an electronic control unit that is configured to control the first rotating electrical machine, the second rotating electrical machine, the clutch, and the internal combustion engine, such that the hybrid vehicle runs while making a changeover among a plurality of running modes, the plurality of the running modes including series hybrid running and parallel hybrid running, the series hybrid running being designed to control the clutch to the decoupling state and operate the internal combustion engine such that the hybrid vehicle runs by an output of the second rotating electrical machine while the first rotating electrical machine generates the electric power, the parallel hybrid running being designed to control the clutch to the coupling state and operate the internal combustion engine such that the hybrid vehicle runs using at least part of an output of the internal combustion engine, and the electronic control unit being configured to set a range of state of charge of the electrical storage device such that the range of state of charge that is set during the parallel hybrid running includes a region of state of charge that is higher than the range of state of charge that is set during the series hybrid running, wherein
   the plurality of the running modes includes EV running,
   the EV running is designed to control the clutch to the decoupling state, stop the internal combustion engine, and cause the hybrid vehicle to run by an output of the second rotating electrical machine,
   the electronic control unit includes a charge depleting mode and a charge sustaining mode as control modes,
   the electronic control unit is configured to select one of the series hybrid running, the parallel hybrid running, and the EV running in accordance with a running situation of the hybrid vehicle in each of the charge depleting mode and the charge sustaining mode, and
   the electronic control unit is configured to set the range of state of charge during control in the charge sustaining mode such that the range of state of charge that is set during the parallel hybrid running includes a region on the state-of-charge that is higher than the range of state of charge that is set during the series hybrid running.

2. The hybrid vehicle according to claim 1, wherein
   the electronic control unit is configured to operate the internal combustion engine and select the series hybrid running or the parallel hybrid running when a sum of a running power required for running of the vehicle and a charging and discharging power of the electrical storage device exceeds a threshold in each of the charge depleting mode and the charge sustaining mode, and
   the electronic control unit is configured to control the output of the internal combustion engine in each of the series hybrid running and the parallel hybrid running to the running power during control in the charge depleting mode.

3. The hybrid vehicle according to claim 1, wherein
   a speed ratio between an output shaft of the internal combustion engine and an axle of the driving wheel is fixed when the clutch is in the coupling state.

* * * * *